(12) United States Patent
Owen et al.

(10) Patent No.: US 11,644,531 B2
(45) Date of Patent: May 9, 2023

(54) DEVOID CLUTTER CAPTURE AND FILLING (DECCAF) TO COMPENSATE FOR INTRA-CPI SPECTRAL NOTCH VARIATION

(71) Applicant: University of Kansas, Lawrence, KS (US)

(72) Inventors: Jonathan William Owen, Lawrence, KS (US); Gerald Brandon Ravenscroft, Gardner, KS (US); Shannon D. Blunt, Shawnee, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 17/761,391

(22) PCT Filed: Sep. 21, 2020

(86) PCT No.: PCT/IB2020/058775
§ 371 (c)(1),
(2) Date: Mar. 17, 2022

(87) PCT Pub. No.: WO2021/053640
PCT Pub. Date: Mar. 25, 2021

(65) Prior Publication Data
US 2022/0349991 A1 Nov. 3, 2022

Related U.S. Application Data

(60) Provisional application No. 62/903,618, filed on Sep. 20, 2019.

(51) Int. Cl.
*G01S 7/02* (2006.01)
*G01S 7/288* (2006.01)
*G01S 13/58* (2006.01)

(52) U.S. Cl.
CPC ............ *G01S 7/023* (2013.01); *G01S 7/0232* (2021.05); *G01S 7/288* (2013.01); *G01S 13/582* (2013.01)

(58) Field of Classification Search
CPC .. H04B 10/2581; H04B 10/60; H04B 7/0413; G01S 13/582; G01S 11/12; G01S 7/023;
(Continued)

(56) References Cited

U.S. PATENT DOCUMENTS 5,539,412 A 7/1996 Mendelson
9,057,785 B1 * 6/2015 Lee ........................ G01S 13/582
(Continued)

OTHER PUBLICATIONS

Chen et al. "Moving Target Detection Using Colocated MIMO Radar on Multiple Distributed Moving Platforms." IEEE Transactions on Signal Processing, vol. 65, No. 17, Sep. 1, 2017, pp. 4670-4683.
(Continued)

*Primary Examiner* — Olumide Ajibade Akonai
(74) *Attorney, Agent, or Firm* — Norton Rose Fulbright US LLP

(57) ABSTRACT

An ad hoc approach denoted as devoid clutter capture and filling (DeCCaF) that addresses the nonstationarity effects that arise when input radar waveform returns exhibiting dynamic spectra variations are processed to combat dynamic RFI is disclosed. Portions of the spectra of each input waveform return of a set of input radar waveform returns processed during the CPI may be filled with clutter information borrowed from other waveform returns of the set of waveform returns. DeCCaF may combined with an appropriate filter (e.g., a matched filter, a mismatched filter) to achieve results that are nearly indistinguishable from input radar waveform returns in which no spectral variation are present.

20 Claims, 20 Drawing Sheets

(58) Field of Classification Search
CPC ........ G01S 13/006; G01S 13/24; G01S 13/34; G01S 7/288; G01S 7/285; G01S 13/26; G01S 7/0232; G01S 7/292
See application file for complete search history.

(56) References Cited

U.S. PATENT DOCUMENTS

| | | | |
|---|---|---|---|
| 2004/0150552 A1* | 8/2004 | Barbella | G01S 13/24 342/111 |
| 2004/0178951 A1* | 9/2004 | Ponsford | G01S 7/2921 342/194 |
| 2015/0301167 A1 | 10/2015 | Sentelle et al. | |
| 2016/0054440 A1 | 2/2016 | Younis | |
| 2017/0307729 A1 | 10/2017 | Eshraghi et al. | |
| 2021/0405183 A1* | 12/2021 | Vossiek | G01S 13/003 |

OTHER PUBLICATIONS

Owen et al. "Devoid Clutter Capture and Filling (DeCCaF) to Compensate for Intra-CPI Spectral Notch Variation." 2019 International Radar Conference (RADAR2019), 2019, 6 pages.
International Search Report and Written Opinion from PCT/IB2020/058775 dated Feb. 8, 2021, 8 pages.

* cited by examiner

DEVOID CLUTTER CAPTURE AND FILLING (DECCAF) TO COMPENSATE FOR INTRA-CPI SPECTRAL NOTCH VARIATION

PRIORITY

The present application claims the benefit of U.S. Provisional Application No. 62/903,618, filed Sep. 20, 2019 and entitled "DEVOID CLUTTER CAPTURE AND FILLING (DeCCaF) TO COMPENSATE FOR INTRA-CPI SPECTRAL NOTCH VARIATION," the contents of which are incorporated herein by reference in their entirety.

GOVERNMENT INTEREST

This application is a national phase application under 35 U.S.C. § 371 of International Application No. PCT/IB2020/058775 filed Sep. 21, 2020, which claims priority to U.S. Provisional Patent Application No. 62/903,618 filed Sep. 20, 2019. The entire contents of each of the above-referenced disclosures is specifically incorporated by reference herein without disclaimer.

TECHNICAL FIELD

The present disclosure is generally related to radar systems and more specifically to techniques for mitigating nonstationarity effects during radar sensing operations caused by coherently processing radar returns from multiple transmit waveforms having non-identical frequency spectra (due to dynamic spectral variation).

BACKGROUND

Increased competition for RF spectrum, particularly for the large swaths occupied by radar, is motivating research into spectrum sharing as well as some forms of cognitive radar that are able to sense and avoid radio frequency interference (RFI). When RFI is dynamically changing during the coherent processing interval (CPI) of the radar, this interference avoidance capability must likewise perform at or near the rate of the pulse repetition frequency (PRF).

A rapid spectral sensing method (for identifying RFI), coupled with the ability to design and physically generate spectrally notched radar waveforms may provide a prospective solution to the problem of dynamic RFI. The nature of frequency modulated (FM) waveforms makes them appropriate for high-power radar applications, which represent the situations whereby one would expect the greatest amount of interference to be produced by the radar to other spectrum users.

It has been experimentally shown that spectral notches having better than 50 dB depth relative to the peak of the power spectrum can be achieved under modest transmitter distortion. Similar interference rejection can subsequently be obtained within the radar receiver during pulse compression simply by performing matched filtering, under the caveat that the receiver is not saturated. However, a notable limitation that has been observed, even when spectral notches are able to precisely track the spectral locations of in-band RFI, is that the changing notch locations introduces a nonstationarity effect when coherently processed on receive that hinders clutter cancellation. It has been shown that this degradation is linked to a distortion of the delay/Doppler point spread function.

It has very recently been demonstrated that the use of a spectrally notched form of optimal mismatched filtering (MMF) can be used to partially compensate for this degradation. Generally speaking, the MMF approach addresses the range sidelobe modulation (RSM) of clutter that naturally arises when varying the waveform during the CPI. However, the nonstationarity effects induced by coherently processing waveforms with changing notch locations across multiple waveforms during the CPI is more than a clutter RSM effect and thus further steps are required to compensate for the remaining residual clutter.

SUMMARY

Cognitive spectral notching of FM waveforms on transmit has been experimentally shown to be an effective means with which to avoid in-band interference. However, to contend with dynamic interference, the transmit notch may be required to move during the radar coherent processing interval (CPI), which introduces a nonstationarity effect during coherent processing that results in increased residual clutter after cancellation. It was recently shown that optimal mismatched filtering (MMF) can partially mitigate this degradation while maintaining the necessary spectral notch for interference mitigation. Here a new approach to compensate for this nonstationarity is proposed that borrows the missing portion of the clutter (due to notching) from another pulsed response for which the notch is in a different location. By using this borrowed response to fill in the notched clutter, subsequent clutter cancellation largely avoids the nonstationarity effect so that the corresponding residue is reduced. It is shown using measured data that the combination of this clutter filling approach with notched MMFs realizes clutter cancellation performance on par with full-band waveforms that do not possess spectral notching.

To solve the problems associated with nonstationarity distortion described above, an ad hoc approach denoted as devoid clutter capture and filling (DeCCaF) is proposed whereby a clutter response from a different pulse is bandpass filtered (BPF) commensurate with a notch location in a present pulse and then subsequently added to a clutter response for the present pulse. To illustrate, suppose that a first transmitted radar waveform has a given spectral notch and that subsequently transmitted radar waveforms have spectral notches that have non-identical (in terms of location, width, or both) to the first transmitted radar waveform. The transmitted waveforms sequentially backscatter from the environment and the returns are measured. Input radar waveform returns (e.g. reflections of transmitted radar waveforms having notches within their spectra) may be received and processed to perform radar detection operations. An ensemble of the input waveform returns may be processed during a CPI such that the resulting Doppler plot exhibits nonstationarity effects (or clutter modulation) due to relative spectral variations between pulses caused by the dynamic frequency notches, which may hinder certain aspects of radar detection processing, such as clutter cancellation. For example, moving spectral notches (e.g., having different spectral notch locations in the input waveform returns) during the CPI hinders clutter cancellation because the inter-pulse variation due to changing notches introduces significant deviations to the average spectral density of the set of waveforms in the CPI.

To mitigate the nonstationarity effects caused by coherently processing the set of input radar returns having different notch locations, each input waveform return (with a given notch location) may be spectrally filled using portions of other pulse returns (with spectral notches at different locations, thus having spectral information that the aforementioned waveform return otherwise lacks). Filling the spectral content of each input waveform return with portions of spectral content from other input radar waveform returns (e.g., portions of the spectra that do not correspond to spectral notches) may mitigate the nonstationarity effects when performing Doppler processing across the set of spectrally-filled input waveform returns and enable clutter information to be determined more effectively, in part due to homogenization of the input waveform return spectra within the CPI. For example, the input waveform returns may initially be devoid of clutter information at the locations where the spectral notches are present, but filling the spectral notches with spectra from one or more other waveform returns having clutter information in the locations of the spectral notches may produce a set of input waveforms returns that are more suitable for radar processing operations, such as Doppler processing and clutter cancellation. Utilizing the waveform returns with the spectral notches that have been filled using clutter information from other waveforms in the CPI for radar operations may improve radar detection operations by enabling more accurate and clear moving target detection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
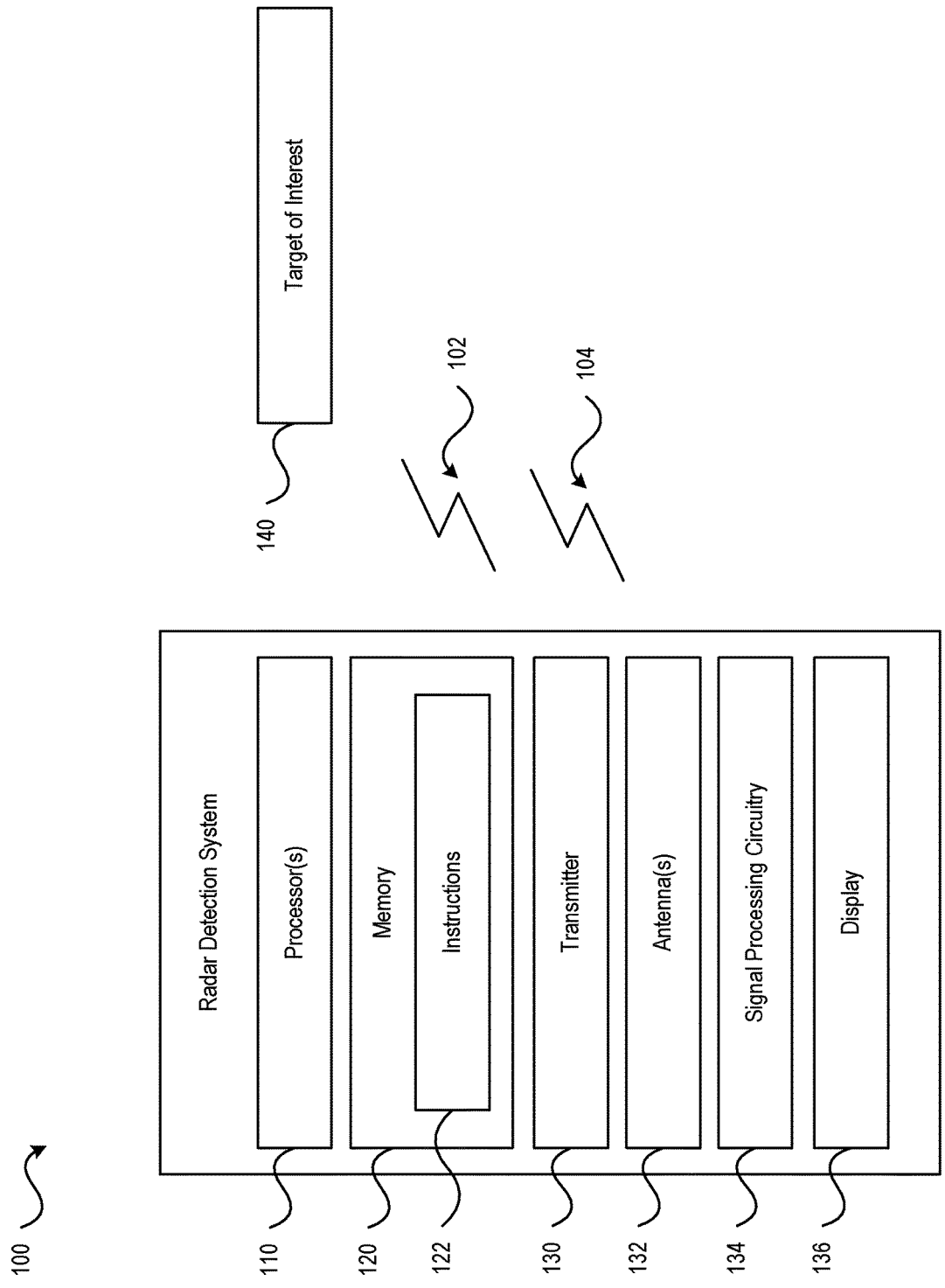
FIG. 1 is a block diagram of a radar system in accordance with aspects of the present disclosure.

Referring to FIG. 1, a block diagram of a radar system in accordance with aspects of the present disclosure is shown as a radar detection system 100. The radar detection system 100 provides improved detection of moving targets by mitigating the impact of nonstationarity effects induced by coherently processing during clutter cancellation. For example, the radar detection system 100 may be configured to detect the moving targets based on sets of waveforms having non-homogeneous spectra or other irregularities. The irregularities may be caused by spectral notching, sense-and-avoidance techniques, or other techniques used to generate output radar waveforms (e.g., radar waveforms transmitted by the radar detection system 100). The radar detection system 100 may process a set of input radar waveform returns (e.g., reflections of the transmitted radar waveforms having irregular, non-homogenous or continuous spectra) within a coherent processing interval (CPI) to perform moving target detection. As described above, clutter modulation or non-stationary effects may be present due to the irregularities within the spectra of the set of input radar waveform returns when performing radar processing, which may degrade the ability to perform moving target detection. However, the radar detection system 100 of embodiments may be configured to homogenize the spectra of the input set of radar waveform returns by borrowing, for each input radar waveform return within the CPI, portions of the spectrum from another waveform return. For example, suppose a first radar waveform return within the set has a notch at a first spectral location but a second radar waveform return within the set does not have a notch at the first location. The spectrum of the second radar waveform return at the first waveform return spectral notch location may be used to fill the spectral portion of the first radar waveform return corresponding to the notch. This process may be repeated for each input radar waveform return considered during the CPI and once all radar waveform returns have been processed in this manner, the clutter modulation or non-stationary effects resulting from processing may be mitigated, thereby improving the moving target detection process. Operations to mitigate clutter modulation and non-stationary effects according to aspects of the present disclosure are described in more detail below.

As shown in FIG. 1, the radar detection system 100 may include one or more processors 110, a memory 120, a transmitter 130, one or more antennas 132, signal processing circuitry 134, and a display device 136. The one or more processors 110 may include one or more central processing units (CPUs) and/or graphics processing units (GPUs) each having one or more processing cores, digital signal processors (DSPs), application specific integrated circuits (ASICs), field programmable gate arrays (FPGAs), or other circuitry configured to process data in accordance with aspects of the present disclosure.

The memory 120 may include random access memory (RANI) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the radar detection system 100 may be stored in the memory 120 as instructions 122 that, when executed by the one or more processors 110, cause the one or more processors 110 to perform the operations described herein with respect to the radar detection system 100, as described in more detail below. For example, the instructions 122 may correspond to software that may be executed by the one or more processors 110 to perform moving target detection utilizing the techniques disclosed herein for mitigating the impact of clutter modulation and non-stationarity effects during processing of received input radar waveform returns 104 in accordance with the present disclosure. It is noted that although aspects of the present disclosure are capable of implementation via software, it should be understood that the techniques disclosed herein may be readily implemented in hardware if desired. Accordingly, the present disclosure is not to be limited to software implementation.

The transmitter 130 may be configured to generate and transmit radar waveforms, shown in FIG. 1 as output radar waveforms 102. In an aspect, the output radar waveforms 102 may be non-identical waveforms. For example, the output radar waveforms may be spectrally notched radar waveforms having an FM noise structure. As another example, the output radar waveforms may include a plurality of different chirp waveforms, where at least some of the chirp waveforms may have different center frequencies and bandwidth to avoid radio frequency (RF) interference. Such waveforms may be utilized in what may be referred to as a sense-and-avoid approach, where the center frequency and bandwidth of the transmitted radar waveforms varies to avoid interference caused by other waveforms present in the environment. Due to variation in the spectra of a set of sense-and-avoid waveforms over a CPI, such waveforms may also exhibit qualities similar (but not necessarily identical) to notched radar waveforms, such as clutter modulation and non-stationarity effects resulting from processing over a CPI.

The one or more antennas 132 may be configured to receive reflections of transmitted radar waveforms. For example, as the output radar waveforms 102 are transmitted, at least some of those waveforms may be reflected back by objects present in the environment, such as a target of interest 140, and received at the one or more antennas 132 as input radar waveform returns 104. The input radar waveform returns 104 may be used to perform radar detection operations, such as moving target detection, which may enable the radar detection system 100 to track moving targets within the environment, such as the target of interest 140.

The signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. The signal processing circuitry 134 may be configured to homogenize the frequency spectra of various non-identical waveforms within the ensemble of waveforms of a CPI, as described in more detail below. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system.

The display device 136 may be configured to display radar data associated with detection of moving targets. Although not shown in FIG. 1, the radar detection system 100 may include one or more input/output (I/O) devices. The one or more I/O devices may include a keyboard, a stylus, one or more touchscreens, a mouse, a trackpad, a camera, one or more speakers, haptic feedback devices, or other types of devices that enable a user to receive information from or provide information to the radar detection system 100, such as information provided or input to the radar detection system 100 by a user.

During operation, the transmitter 130 may generate the output radar waveforms 102 for transmission via the transmitter 130 of the radar detection system 100 and objects within the path of the output radar waveforms 102, such as target of interest 140, may reflect the output radar waveform 102. Some of these reflections may be received as input radar waveform returns 104 at the one or more antennas 132. The input radar waveform returns 104 may be provided as input to the signal processing circuitry 134 to facilitate processing of the input radar waveform returns 104 in accordance with aspects of the present disclosure. The processing of the input radar waveform returns may be utilized to perform moving target detection and the results of the moving target detection may be displayed at the display device 136, which may facilitate detection of and/or tracking of movement with respect to the target of interest 140.

Figure 2:
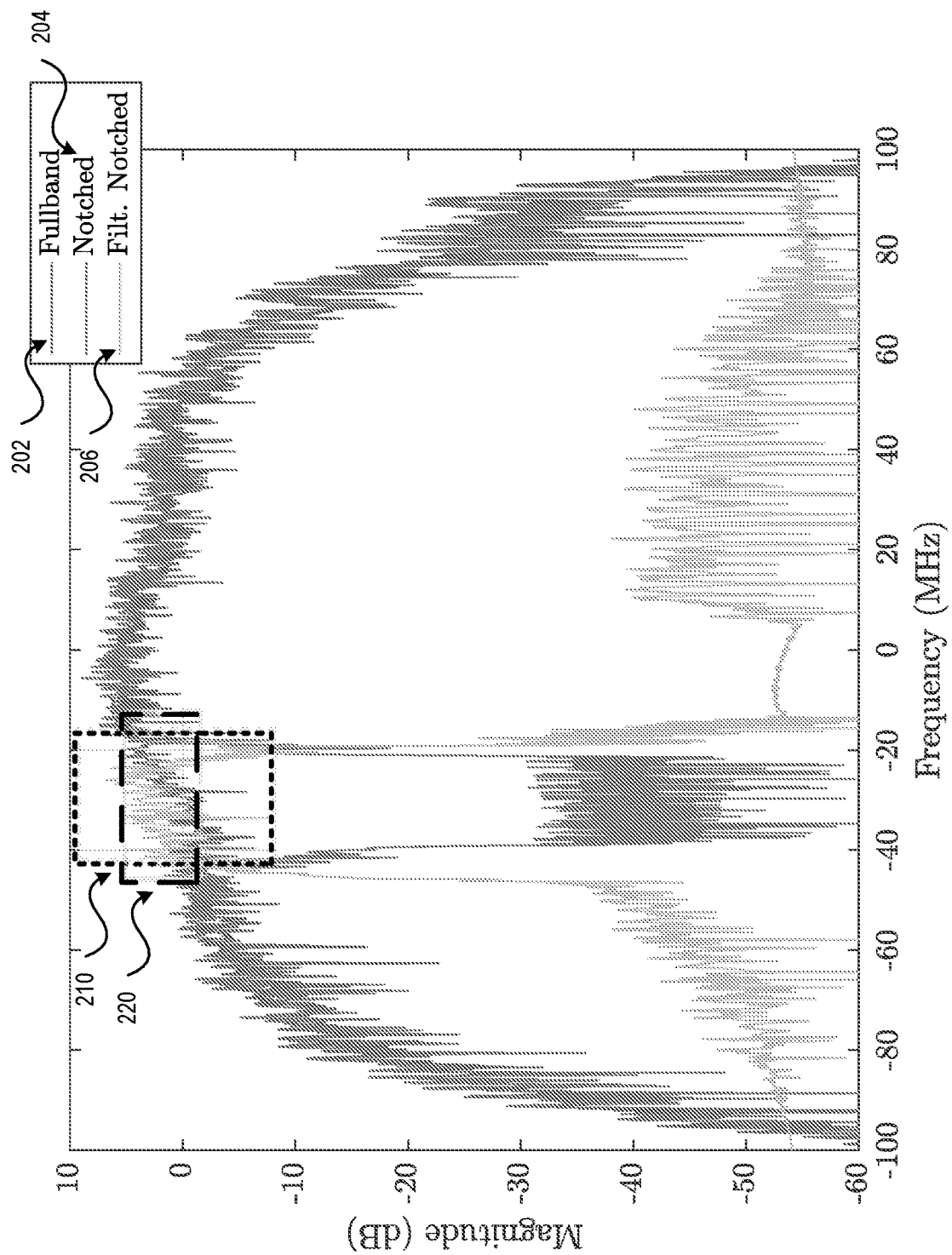
FIG. 2 is an image illustrating aspects of performing cluttering filling for spectrally notched waveform returns in accordance with aspects of the present disclosure.

However, as described above, the input radar waveform returns may include non-homogeneous spectra due to the use of spectral notches, sense-and-avoid techniques, or for other reasons. Clutter-filling operations may be performed to mitigate the impact that the non-homogenous spectra of a set of input radar waveform returns (e.g., a set of input radar waveform returns 104 being processed during a CPI) have on moving target detection. As an example and referring to FIG. 2, a plot illustrating aspects of using spectrally notched waveforms to perform radar detection operations according to embodiments of the present disclosure is shown. In FIG. 2, a fullband waveform 202 (i.e., a waveform that does not include a spectral notch) is shown, along with a first notched waveform 204 and a second band-pass filtered notched waveform 206. If the waveforms shown in FIG. 2 are present within a CPI, the notched portion 210 of the first waveform may be filled by borrowing a portion 220 of the spectrum of the second waveform 206 (or a portion of the fullband waveform 202). This clutter filling approach may be repeated for each pulse within the CPI. Upon repeating this process for each pulse in the coherent processing interval, each of the pulse returns' spectra become homogenized relative to one another, reducing the degree of clutter modulation and enhancing the ability of the radar detection system 100 to perform moving target detection.

Figure 3:
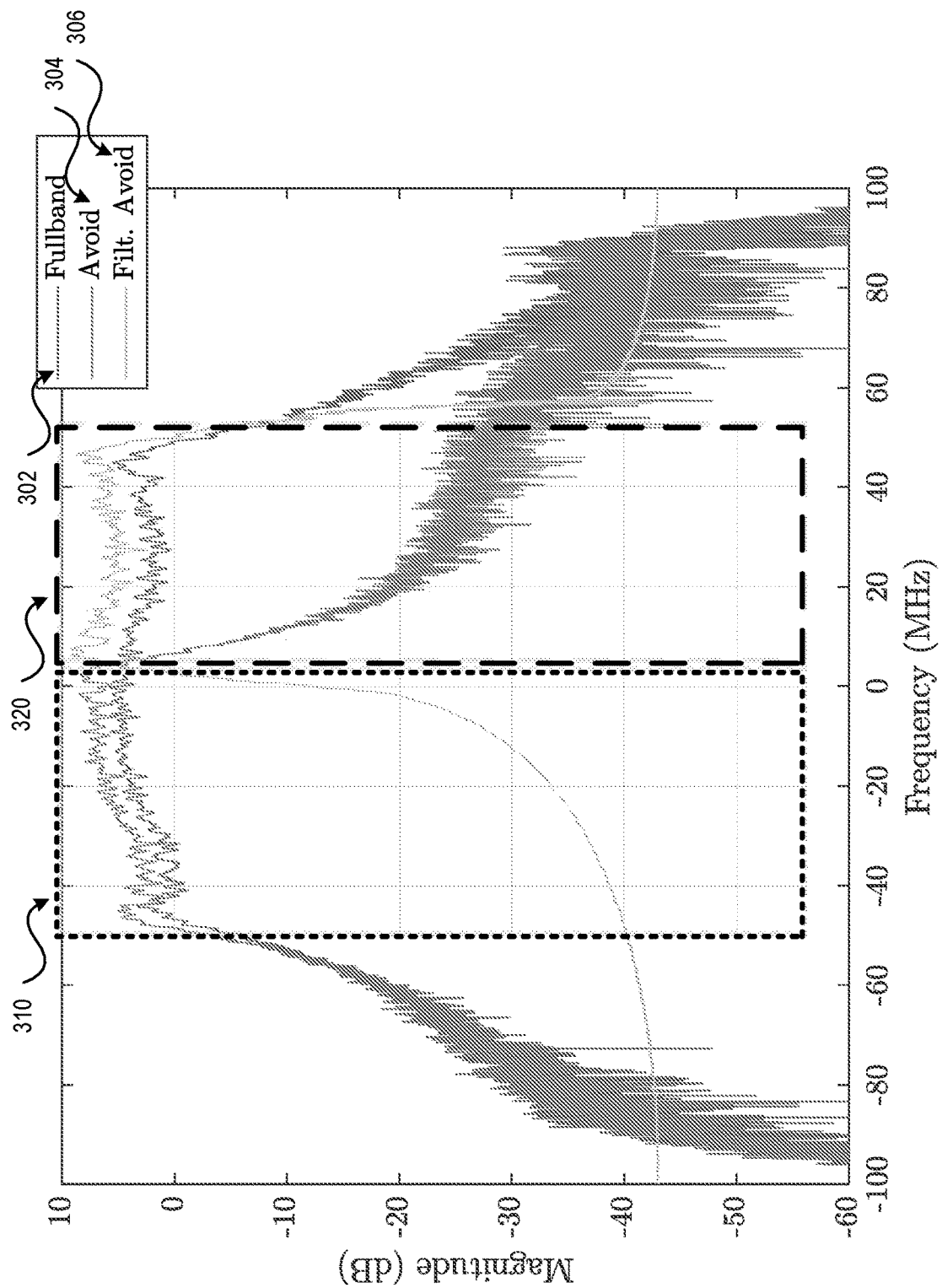
FIG. 3 is an image illustrating aspects of performing cluttering filling for sense-and-avoid waveforms in accordance with aspects of the present disclosure.

As an example and with reference to FIG. 3, a plot illustrating aspects of using sense-and-avoid waveforms to perform radar detection operations according to embodiments of the present disclosure is shown. In FIG. 3, a fullband waveform 302, a first pulse (e.g., waveform) 304 and a second band-pass filtered pulse 306 are shown. If the waveforms shown in FIG. 3 are present within a CPI, the first pulse 304 and the second pulse 306 may cause clutter modulation upon processing a set of waveform returns absent further processing according to embodiments of the present disclosure. To mitigate the clutter modulation, the first pulse 304 may be filled by borrowing spectral information via spectral filtering of a temporally-near pulse that avoided in a different spectral location, such as the second pulse 306. That is to say that spectral filtering may be used to merge the first pulse 304 with the second pulse 306 by combining the portions 310, 320. Upon repeating this process for each pulse in the coherent processing interval, each of the pulse returns' spectra become homogenized relative to one another, reducing the degree of clutter modulation and enhancing the ability of the radar detection system 100 to perform moving target detection.

While the examples shown in FIGS. 2 and 3 illustrate the concept of performing clutter filling for both spectrally notched and sense-and-avoid pulses or waveforms, the processes utilized to achieve those concepts may involve various types of processing that may be performed by radar detection systems, such as the radar detection system 100 of FIG. 1. For example, and referring back to FIG. 1, supposed that the radar waveform is denoted as s(t) and has pulse width T and bandwidth B of 3-dB. Let K indicate the amount of over-sampling with respect to the 3-dB bandwidth to achieve sufficient fidelity. A discretized version may be denoted as $s=[s_1, s_2, \ldots s_N]^T$, where $N=K(BT)$ is the length of vector s.

A banded Toeplitz matrix may be constructed according to:

$$A = \begin{bmatrix} s_1 & 0 & \ldots & 0 \\ \vdots & s_1 & \ddots & \vdots \\ s_N & \vdots & \ddots & 0 \\ 0 & s_N & & s_1 \\ \vdots & & \ddots & \vdots \\ 0 & \ldots & 0 & s_N \end{bmatrix} \quad \text{(Equation 1)}$$

which has dimensions $((M+1)N-1) \times MN$ for MN the length of the MMF (2N to 4N typically). A mismatched filter (MMF) filter may then be given by:

$$h_{MMF} = (\tilde{A}^H \tilde{A} + \sigma I)^{-1}(\tilde{A}^H e_m) \quad \text{(Equation 2)}$$

where σ is a diagonal loading factor, I is an MN×MN identity matrix, $e_m$ is a length $((M+1)N-1)$ elementary vector with a '1' in the mth position (usually near the middle) and zeros elsewhere, and $(\cdot)^H$ is the Hermitian operator.

It is noted that the matrix Ã in Equation 2 is the same as A defined in Equation 1 but with the K−1 rows above and below the mth row replaced with zeros. This modification may provide the "beamspoiling" needed to avoid degradation caused by super-resolution due to s being over-sampled. For the results discussed below, the value of a may be set to be 10% of the largest eigenvalue of $(\tilde{A}^H \tilde{A})$.

As explained above, the presence of moving spectral notches or other non-homogenous pulses during the CPI hinders clutter cancellation because the changing locations of the notches or other non-homogenous portions of the pulses or waveform returns introduce a significant deviation from the average spectral density of the set of waveforms within the CPI. Modest variation of the spectral density already occurs for notch-free random FM waveforms (even those obtained via spectral shaping), though the application of appropriate MMFs has been found to compensate to a sufficient degree. The presence of moving notches or non-homogenous spectral waveforms, however, necessitates more substantial steps to "homogenize" the spectral densities of the set of waveforms within the CPI. The techniques disclosed herein, referred to as Devoid Clutter Capture and Filling (DeCCaF), may provide an approach for performing radar sensing and detection operation despite the presence of spectral notches or other types of waveforms exhibiting non-homogenous spectra within the CPI.

To illustrate, consider a set of M random FM waveforms denoted $s_m(t)$ for m=1, 2, . . . , M that possess the same general spectral density aside from: a) modest variation due to their random nature, and b) spectral notch locations that may change on a pulse-to-pulse basis. For ease of explanation, a case in which only a single notch is present for each pulse will be described. However, it is to be understood that the compensation approach disclosed herein may be readily extended to multiple types of waveforms exhibiting non-homogenous spectra.

The reflected response after transmitting this sequence of waveforms may be expressed as:

$$y_m(t) = s_m(t) * x_m(t) + v_m(t) \quad \text{(Equation 3)}$$

where * is the convolution operation, $x_m(t)$ is the impulse response of the environment during the mth pulse repetition interval (PRI), and $v_m(t)$ is additive noise. Internal clutter motion notwithstanding, the clutter component of this term may be expected to remain essentially unchanged over the CPI.

Figure 4:
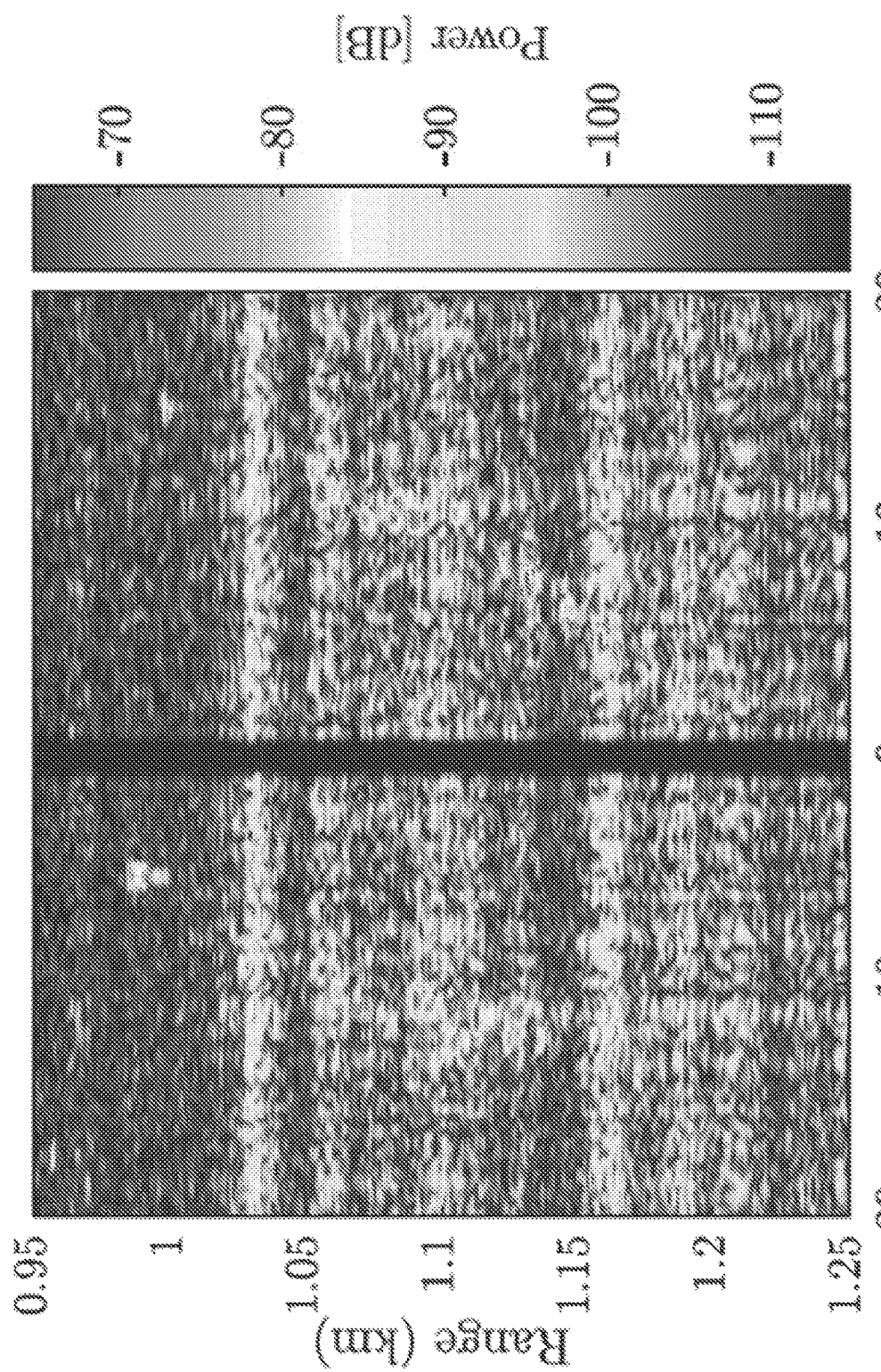
FIG. 4 is an image illustrating a measured range-Doppler response for random FM waveforms with changing spectral notches using matched filtering and no clutter filling.

Pulse compression of the responses of Equation 3 may then be performed, which may be expressed as:

$$z_m(t) = h_m(t) * y_m(t) \quad \text{(Equation 4)}$$

for $h_m(t)$ the matched filter (or MMF) of the mth waveform. Normally (i.e., for waveforms or responses with homogeneous spectra), Doppler processing and clutter cancellation would then be performed across the set of M responses obtained from Equation 4. However, when waveform spectral notches or other non-homogenous waveforms that move during the CPI are present, a result like that depicted in FIG. 4 is obtained. The experimentally measured results shown in FIG. 4 were collected from a stationary platform observing moving vehicles leaving/entering an intersection in Lawrence, Kans. Simple projection-based clutter cancellation was applied that has otherwise been found to be sufficient to the task when spectral notches are either absent or do not move during the CPI. The residual clutter, which takes the form of the large streaks across Doppler in FIG. 4, were caused by the nonstationarity introduced by coherently processing radar waveform returns having moving the spectral notches.

The DeCCaF approach of embodiments seeks to compensate for this residual clutter effect via an ad hoc "clutter filling" solution, briefly described and illustrated above with reference to FIGS. 2 and 3. While the notion of estimation/interpolation of static spectral notches has been used for wideband radar applications to compensate/enhance image quality, the distinction here is that the DeCCaF approach seeks to mitigate clutter modulation so as to better facilitate clutter cancellation, as opposed to mere improvement of image quality.

For DeCCaF, if the mth waveform contains a spectral notch at a given location, a similar spectral portion of the clutter is borrowed from the response generated by a different waveform that does not have a notch in that same location. Denoting the index of that other waveform as $\tilde{m}$ and $w_m(t)$ as a bandpass filter (BPF) whose passband aligns with the notch location of the mth waveform, the borrowed clutter component may be expressed by:

$$c_{m,\tilde{m}}(t) = w_m(t) * z_{\tilde{m}}(t) \quad \text{(Equation 5)}$$

Thus, the DeCCaF response may be obtained by combining the original response with the borrowed clutter via:

$$\bar{z}_m(t) + z_m(t) + c_{m,\tilde{m}}(t) \quad \text{(Equation 6)}$$

Subsequent clutter cancellation may then be performed on the spectrally homogenized data obtained from Equation 6.

As an illustration of the concept expressed in Equation 6 is shown in FIG. 2, which depicts the loopback measured spectra for a full-band waveform (no notch), a notched waveform, and the BPF version of the full-band waveform corresponding to the notch. These full-band and notched waveforms were obtained from completely independent initializations and optimization processes, and thus the only thing they have in common is the same general spectrum shape. While such a "quick and dirty" combination of the notched and BPF waveforms would not yield a spectrum that is identical to that of the full-band waveform, the result may be rather close. Further, since convolution is a linear operation, consideration of FIG. 5 in the context of Equations 3 and 6 implies that this approach should recapture the missing clutter component as long as the clutter phenomenology is sufficiently stationary. As shown in more detail below, experimental evaluation has confirmed the benefits of the DeCCaF approach shown conceptually above.

Figure 5:
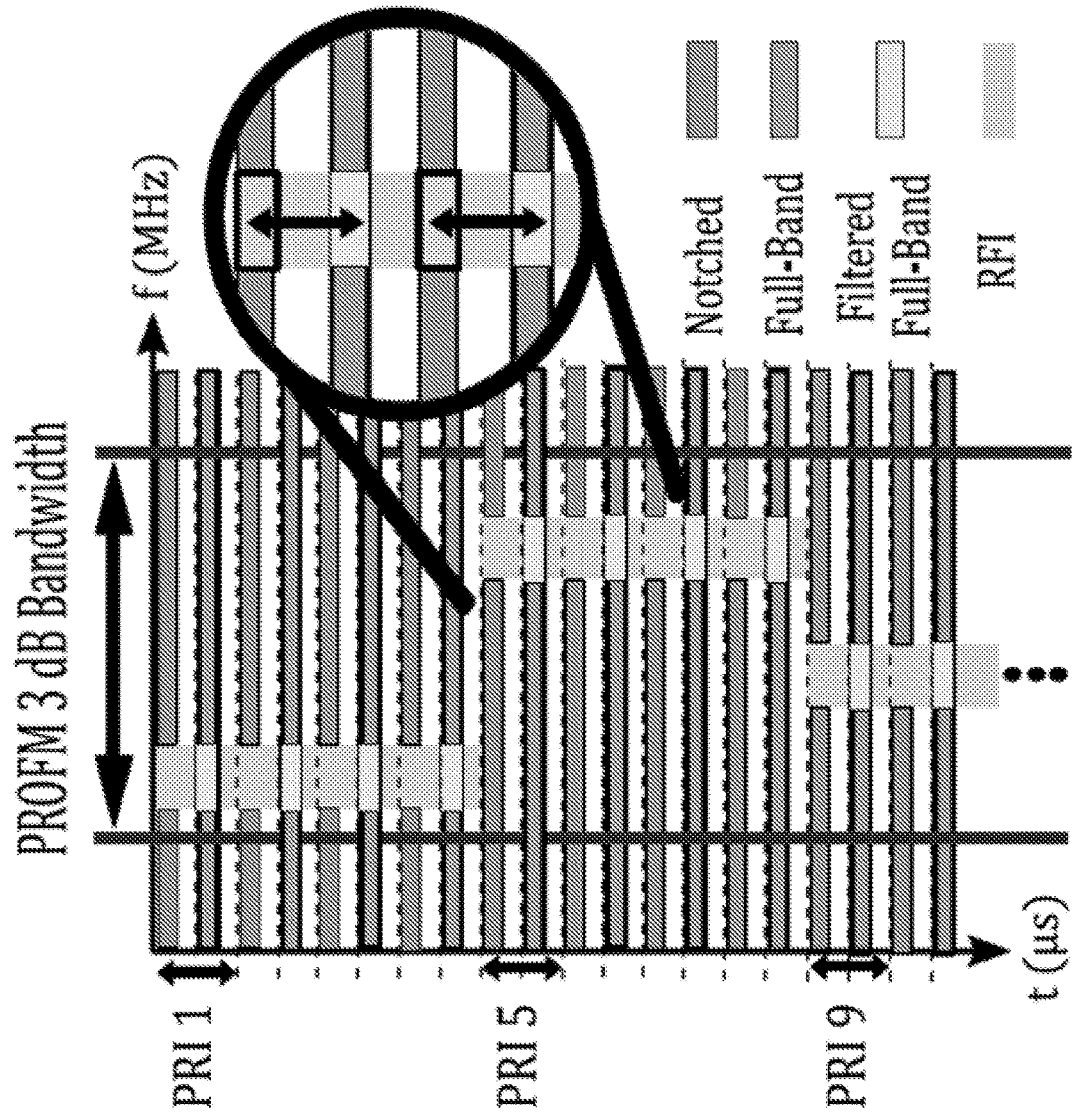
FIG. 5 is an image illustrating a timing diagram of a waveform arrangement used for experimental evaluation of DeCCaF using interleaved full-band and notched waveforms with clutter filling from an adjacent full-band response.

To establish a baseline for achievable performance using the DeCCaF clutter borrowing/filling approach of embodiments, two sets of unique random waveforms were transmitted in an open-air setting with an interleaved arrangement, illustrated in FIG. 5, which illustrates how full-band and notched waveforms may be interleaved with the borrowed clutter taken from an adjacent full-band response. Both sets of waveforms were generated according to the pseudo-random optimized (PRO) FM scheme developed in Jakabosky et al., as described in "Spectral-Shape Optimized FM Noise Radar for Pulse Agility," (IEEE Radar Conf., Philadelphia, Pa., May 2016). One set contained 2500 full-band waveforms that were independently initialized and optimized. The other set likewise contained 2500 independent waveforms, though for these a spectral notch moves to a new random location within the 3-dB bandwidth after every fourth pulse (i.e., a relatively sufficiently stationary clutter phenomenology).

This waveform arrangement may not be suitable for actual cognitive interference avoidance due to the presence of the interleaved full-band waveform but is used here to provide a controlled experiment regarding the utility of borrowed clutter responses. Consequently, four different cases were considered, all illuminating the same measured scene. These four cases included: 1) full-band random waveforms, 2) random waveforms with moving notches and no clutter filling, 3) random waveforms with moving notches where DeCCaF was applied using interleaved full-band responses to performing clutter filling, and 4) the full-band responses were disregarded and the borrowed clutter responses were taken from other notched waveform responses. The last of these represents the operating arrangement one would expect in practice. Both matched filtering and MMF were applied for each case.

It is important to note that, while the primary purpose of this manner of cognitive operation was to mitigate mutual RFI between the radar and other in-band spectrum users, the following results contain the associated spectral notches but not the RFI itself. This is because it has been shown that the degradation from RFI can be significantly reduced, particularly when the RFI possesses good spectral containment. Consequently, the experiments described herein focused solely on the limitation imposed by the moving spectral notches that provide this mutual RFI suppression.

For experimental measurements the PRI was 40 µs and was defined as the time between each interleaved pair of pulses. Each pulse had a duration of 2 µs and a 3-dB bandwidth of B=100 MHz. Thus, each waveform of either type had a time-bandwidth product of BT=200. The CPI for each set of waveforms was 100 ms. The radar emissions were generated at a center frequency of 3.55 GHz, with the reflected echoes captured as in-phase and quadrature (I/Q) data at a rate of 200 Msamples/s. Each spectral notch had a bandwidth of B/10, with the locations randomly assigned within B. Spectral shaping of each notch edge via a Tukey taper was also employed to reduce sin (x)/x range sidelobes that otherwise occurred.

Free-space measurements were collected using separate, yet collocated, transmit and receive antennas, such as the transmitter 130 and the antennas 132 of FIG. 1, on the roof of Nichols Hall on the University of Kansas campus. The waveforms were produced by a Tektronix AWG70002a arbitrary waveform generator and the resulting responses captured with a Rohde & Schwarz FSW26 real-time spectrum analyzer. The illuminated scene was the intersection of 23rd and Iowa Streets in Lawrence, Kans. A loopback measurement of each waveform was also collected so that each matched filter (MF) and MMF could account for the distortion introduced by the transmitter.

Clutter cancellation was applied to the set of reflected responses in each of the three cases by performing a simple zero-Doppler projection (since the platform was stationary) and with the inclusion of a Taylor window to reduce Doppler sidelobes. The LS FM-based MMF was constructed with a length that was 3 times that of the MF and with diagonal loading to avoid notch inversion.

Figure 6:
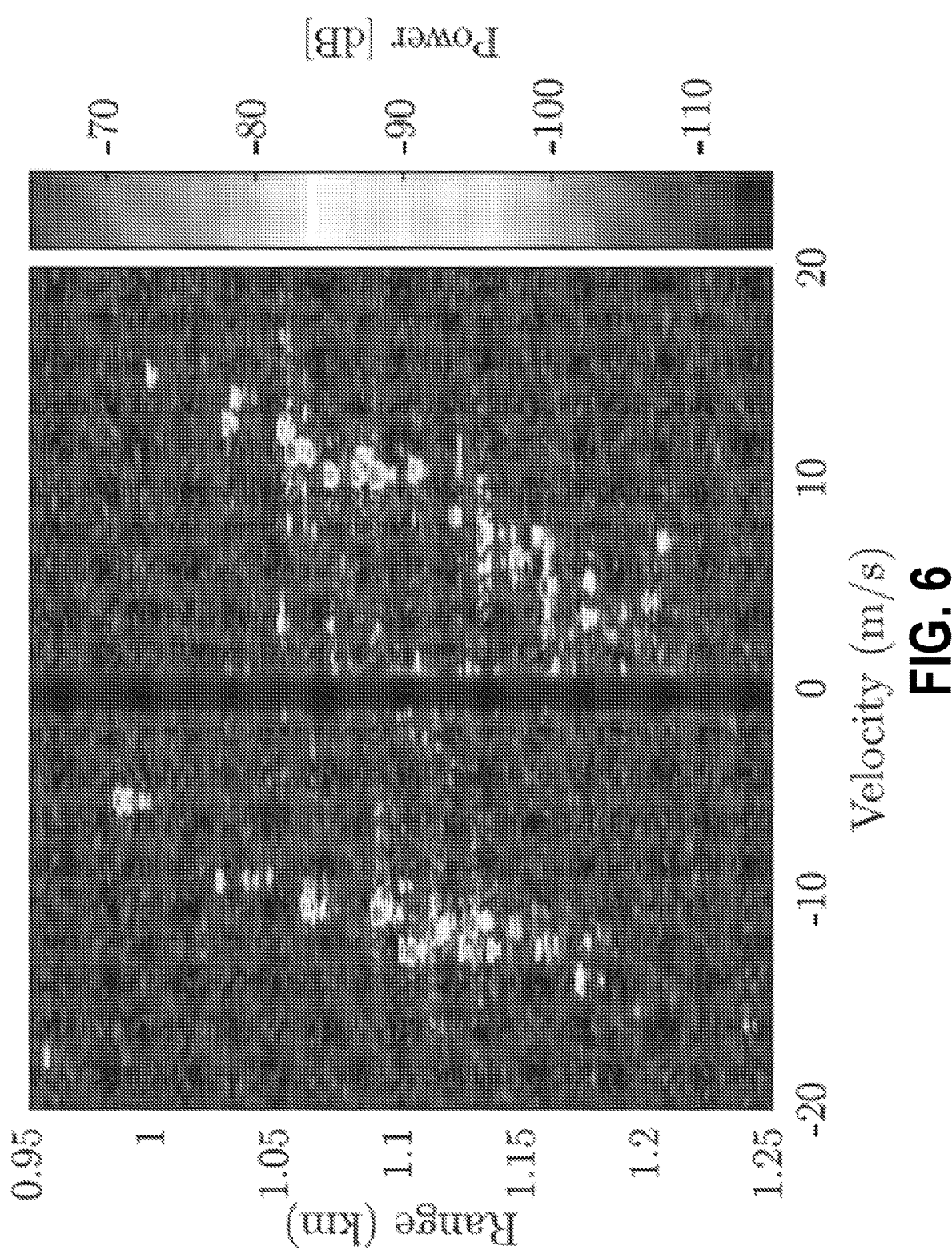
FIG. 6 is an image illustrating a measured range-Doppler response from 2500 full-band PRO-FM waveforms using matched filtering.
Figure 7:
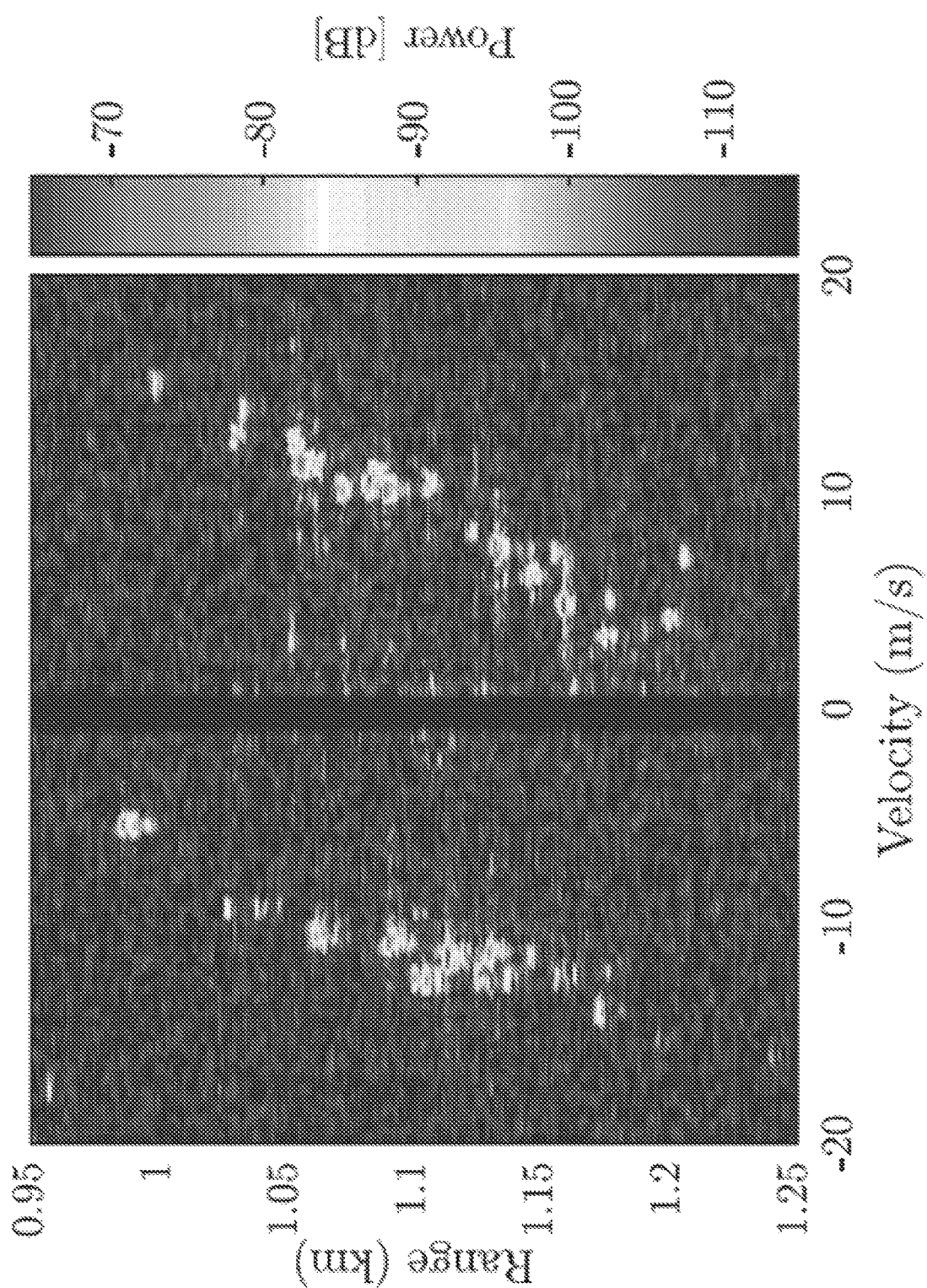
FIG. 7 is an image illustrating a measured range-Doppler response from 2500 full-band PRO-FM waveforms using mismatched filtering.

FIG. 6 and FIG. 7 show the measured range-Doppler responses from the set of baseline full-band PRO-FM waveforms (Case 1) after applying the MF (FIG. 6) and the MMF (FIG. 7). While the MMF exhibits a noticeable reduction in the background noise, which for the most part is actually RSM being suppressed, both figures possess clearly identifiable moving targets. These results are provided to establish a performance baseline for notching and subsequent compensation.

Figure 8:
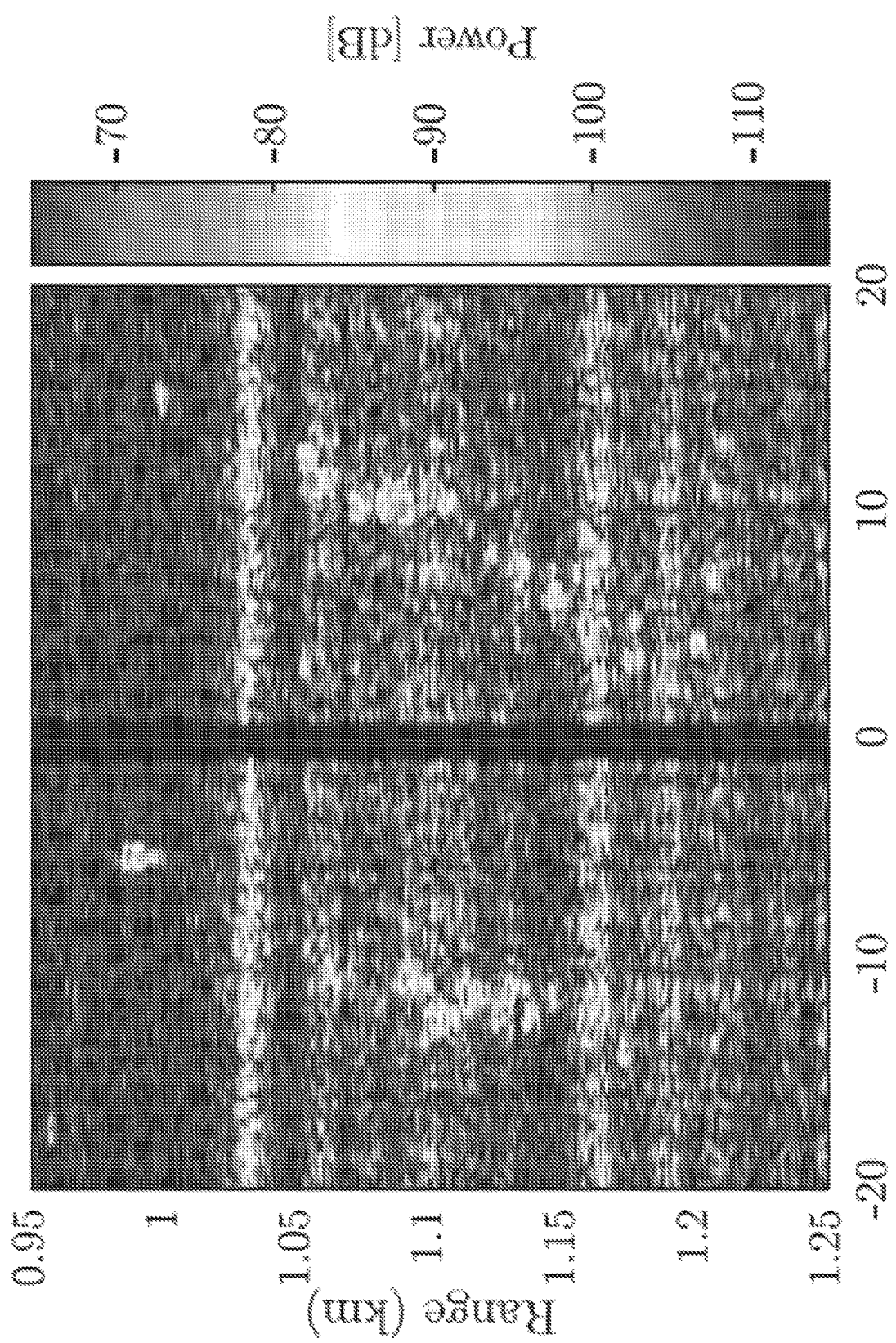
FIG. 8 is an image illustrating a measured range-Doppler response from 2500 PRO-FM waveforms with moving spectral notches using mismatched filtering and no clutter filling.

FIG. 4 and FIG. 8 illustrate the degradation that arises for MF (FIG. 4) and MMF (FIG. 8), respectively, when notched PRO-FM waveforms were employed and the notch locations moved during the CPI (Case 2). The streaks observed in FIG. 4 are smeared clutter that could not be cancelled due to the nonstationarity induced by processing waveform returns with the changing notch locations. The use of notched MMFs, shown in FIG. 8, did provide some compensation for this effect, but it did not completely mitigate the degradation. As discussed above, the reason for this is that the MMFs are addressing the RSM issue but not the more significant nonstationarity introduced by processing waveform returns with the moving notches.

Figure 9:
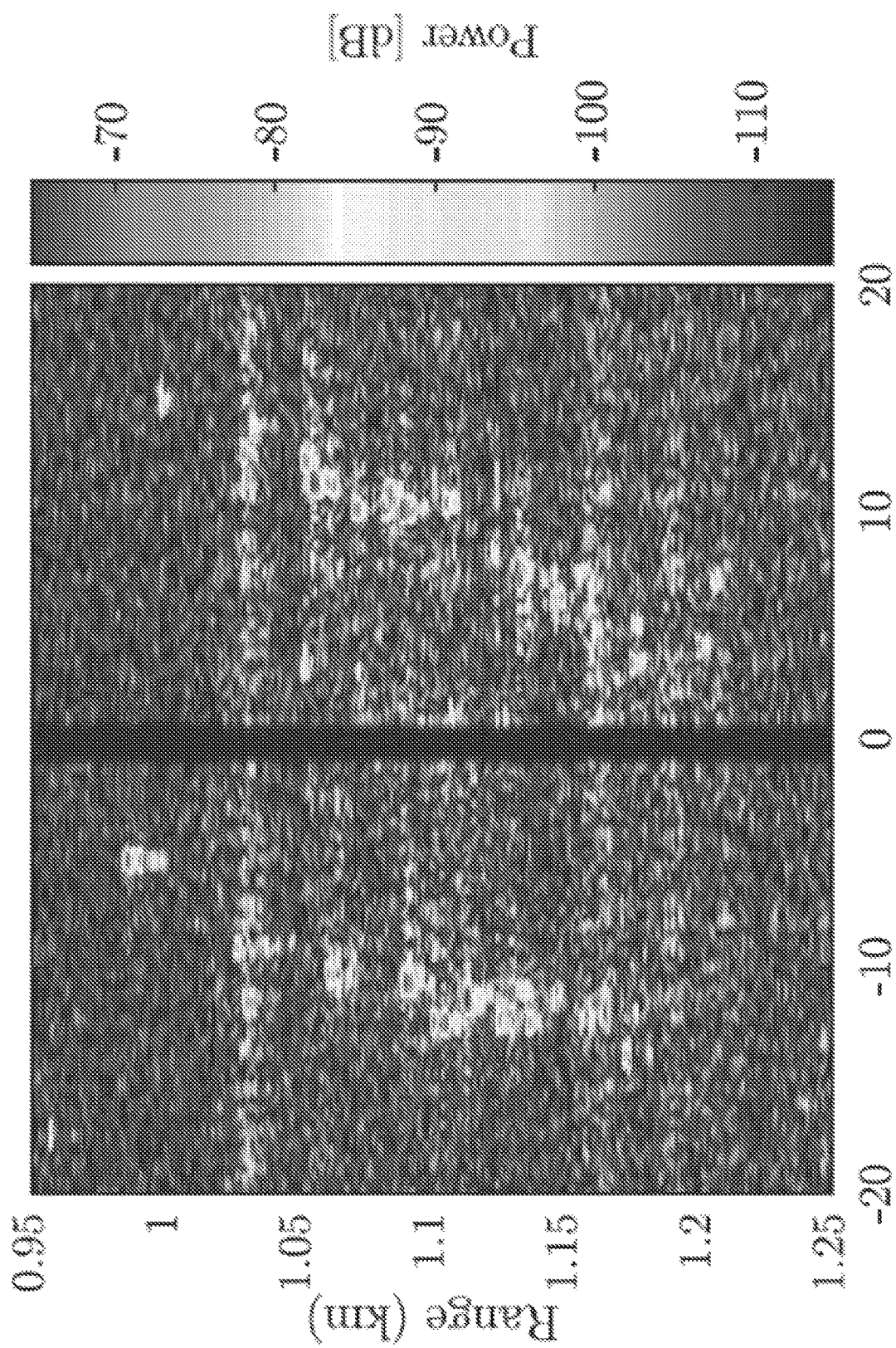
FIG. 9 is an image illustrating a measured range-Doppler response from 2500 PRO-FM waveforms with moving spectral notches obtained by applying interleaved and spectrally-filtered fullband responses for clutter filling using matched filtering and DeCCaF in accordance with aspects of the present disclosure.
Figure 10:
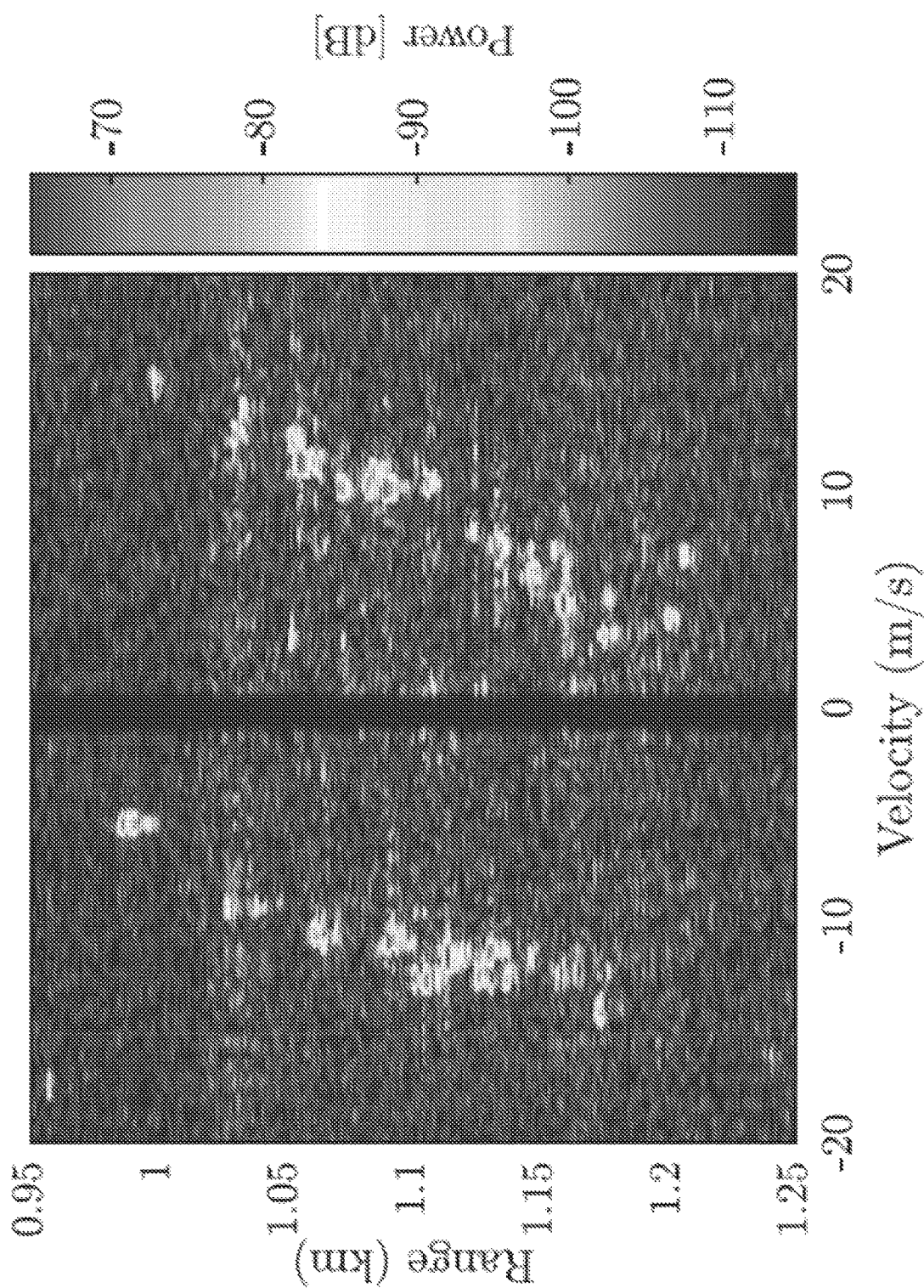
FIG. 10 is an image illustrating a measured range-Doppler response from 2500 PRO-FM waveforms with moving spectral notches obtained by applying interleaved and spectrally-filtered fullband responses for clutter filling using mismatched filtering and DeCCaF in accordance with aspects of the present disclosure.

FIG. 9 and FIG. 10 show the MF and notched MMF range-Doppler responses, respectively, for the same set of notched waveforms when the DeCCaF approach disclosed herein was applied using borrowed clutter generated by adjacent full-band waveforms. From a qualitative standpoint, the MF DeCCaF result in FIG. 10 is rather similar to the previous MMF result of FIG. 8 (no DeCCaF). While not identical, the remaining streaks are similar, particularly the prominent one at a range of roughly 1.04 km that is believed to have been caused by the interaction between notch-induced nonstationarity during processing and a clutter discrete at that range.

However, the response shown in FIG. 10, where both DeCCaF and notched MMFs were applied provided, from a purely qualitative perspective, a result that is quite similar to what was originally obtained in FIG. 6 for matched filtering of full-band waveforms. In other words, utilizing a combination of DeCCaF and MMF techniques came close to completely compensating for degradation imposed by spectral notches that address dynamic RFI.

Figure 11:
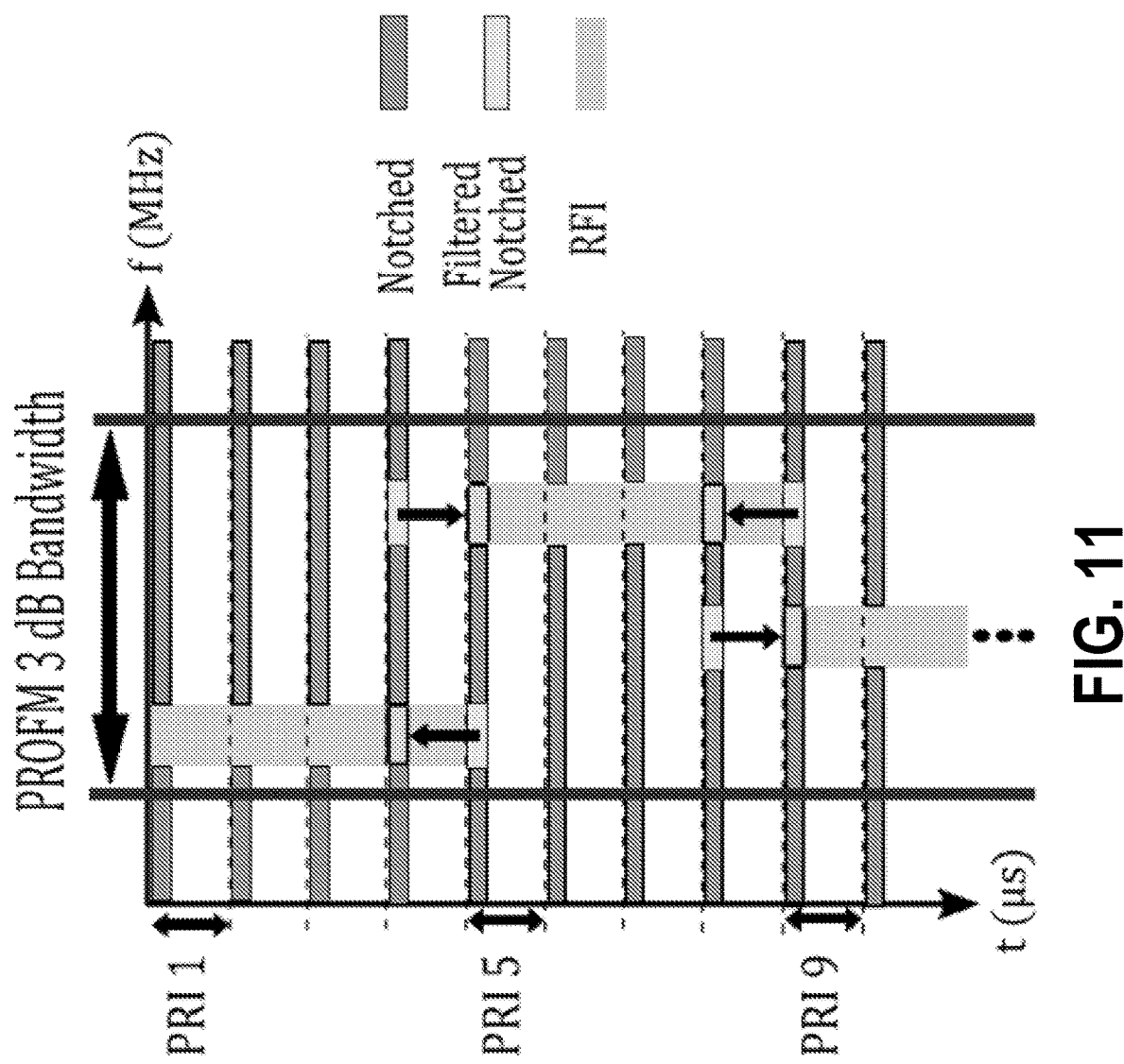
FIG. 11 is an image illustrating a timing diagram of a waveform arrangement used to evaluate an operationally useful form of DeCCaF where borrowed clutter is taken from temporally adjacent, spectrally non-overlapping notched responses.

Having established a baseline performance enhancement for DeCCaF when borrowed clutter responses are taken from a separate (interleaved) set of full-band waveforms, further analysis was performed to consider the impact of borrowing clutter from other notched pulses within the same CPI. Specifically, in these additional cases the BPF clutter was borrowed from the temporally nearest notched waveform that had a non-overlapping notch location relative to the pulse under consideration, as shown in FIG. 11. Thus, in these additional cases, the resulting DeCCaF response involved the re-use of clutter and noise from elsewhere in the CPI, as opposed to the statistically independent instantiations considered in the previous interleaved case (e.g., where clutter was borrowed from full-band waveforms), which would likely not be realistic. Consequently, some degradation in the degree of residual clutter compensation is expected.

Figure 12:
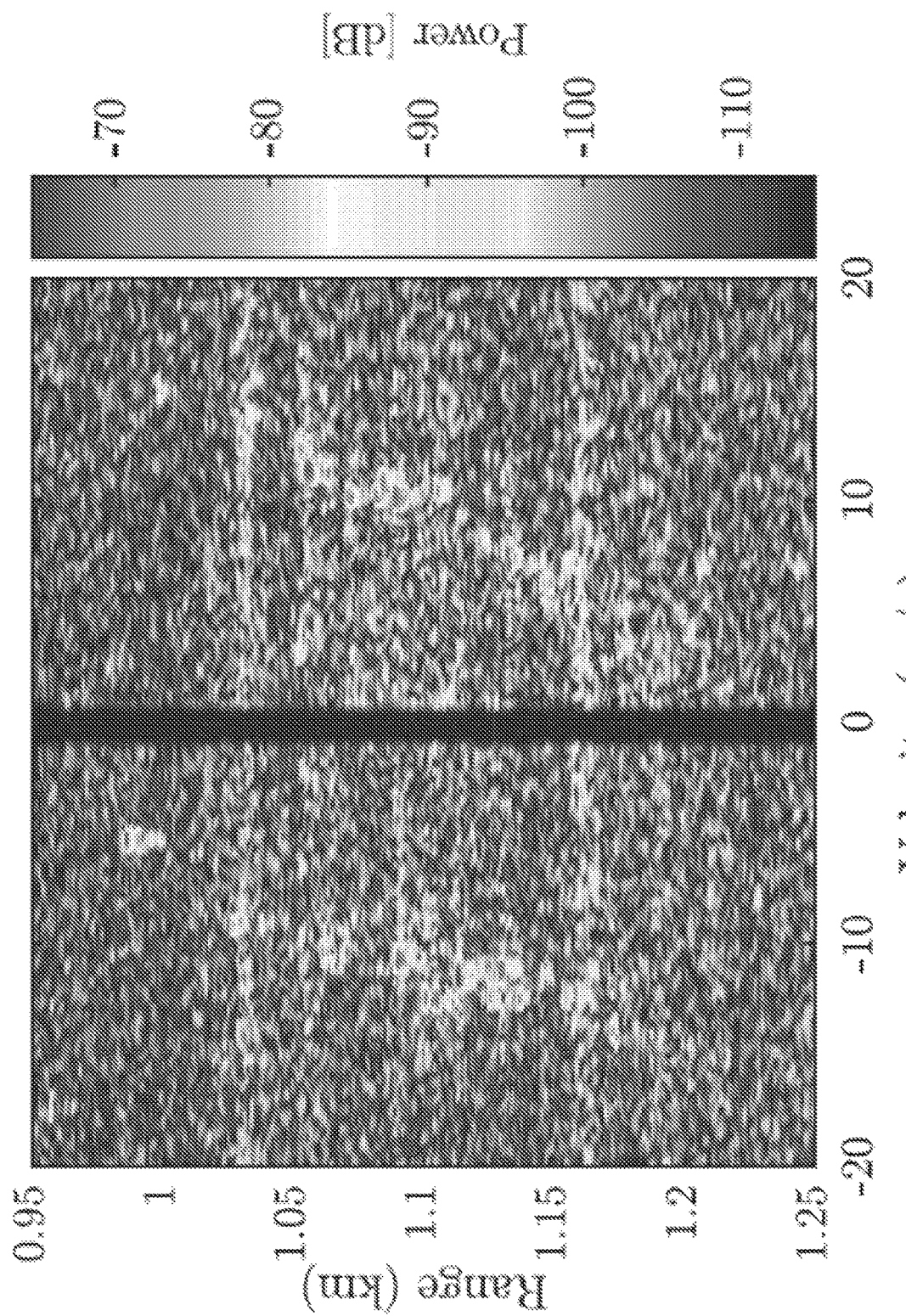
FIG. 12 is an image illustrating a measured range-Doppler response from 2500 PRO-FM waveforms with moving spectral notches obtained by applying adjacent spectrally-filtered notched waveform responses for clutter filling using matched filtering and DeCCaF in accordance with aspects of the present disclosure.
Figure 13:
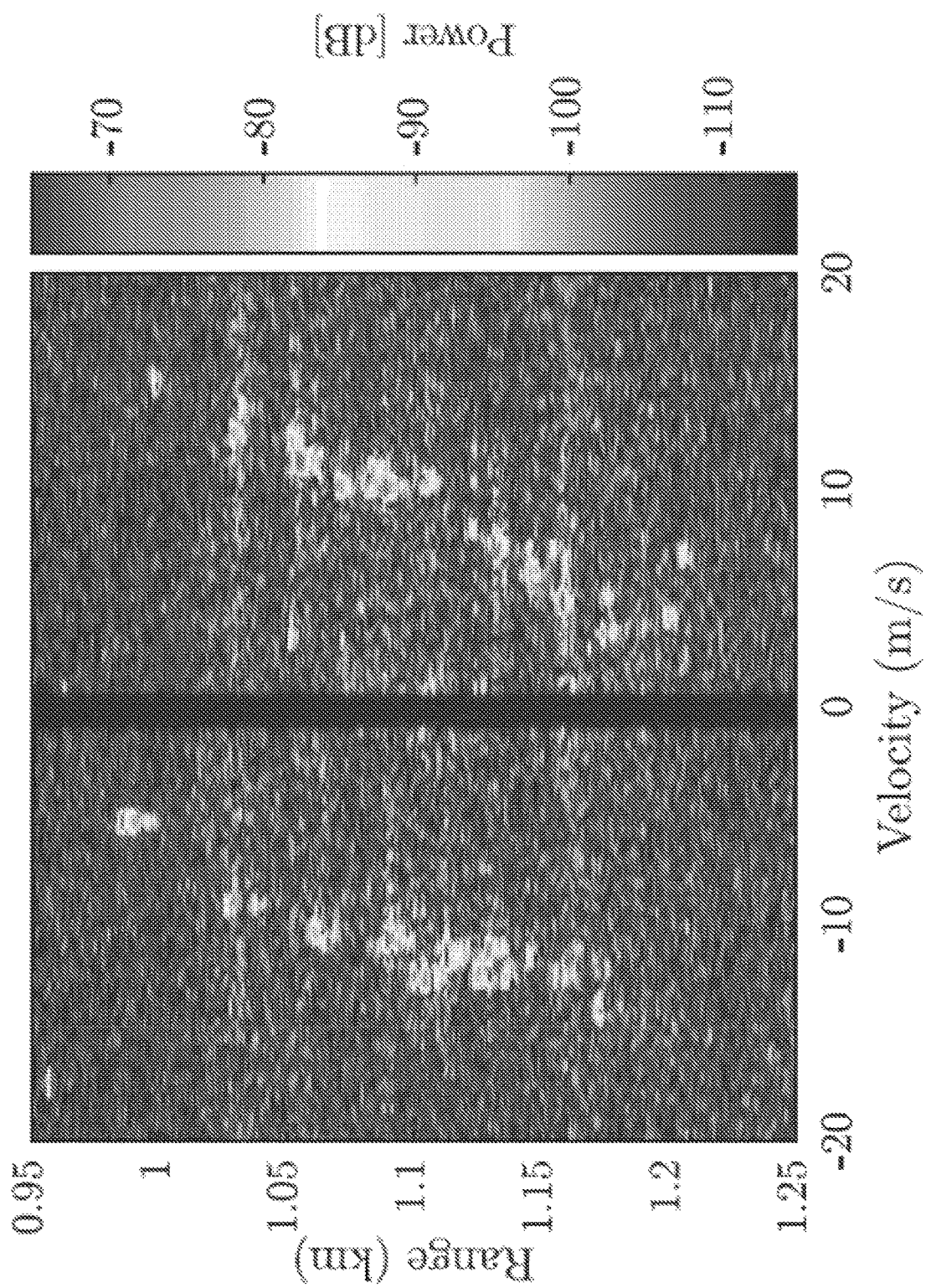
FIG. 13 is an image illustrating a measured range-Doppler response from 2500 PRO-FM waveforms with moving spectral notches obtained by applying adjacent spectrally-filtered notched waveform responses for clutter filling using mismatched filtering and DeCCaF in accordance with aspects of the present disclosure.

FIG. 12 and FIG. 13 show the MF (FIG. 12) and MMF (FIG. 13) range-Doppler responses, respectively, for use cases where DeCCaF was applied. Compared to FIGS. 9 and 10, the residual clutter floor is slightly increased, though the overall performance improvement relative to FIGS. 4 and 8 without DeCCaF is still quite clear. Thus, FIGS. 12 and 13 illustrate that DeCCaF response involving the re-use of clutter and noise from elsewhere in the CPI (e.g., from a temporally near notched waveform having a non-overlapping notch location relative to a pulse under consideration) improves the overall performance of the radar detection system, although not quite to the extent that would be feasible if full-band waveforms were used, as in FIGS. 9 and 10.

Figure 14:
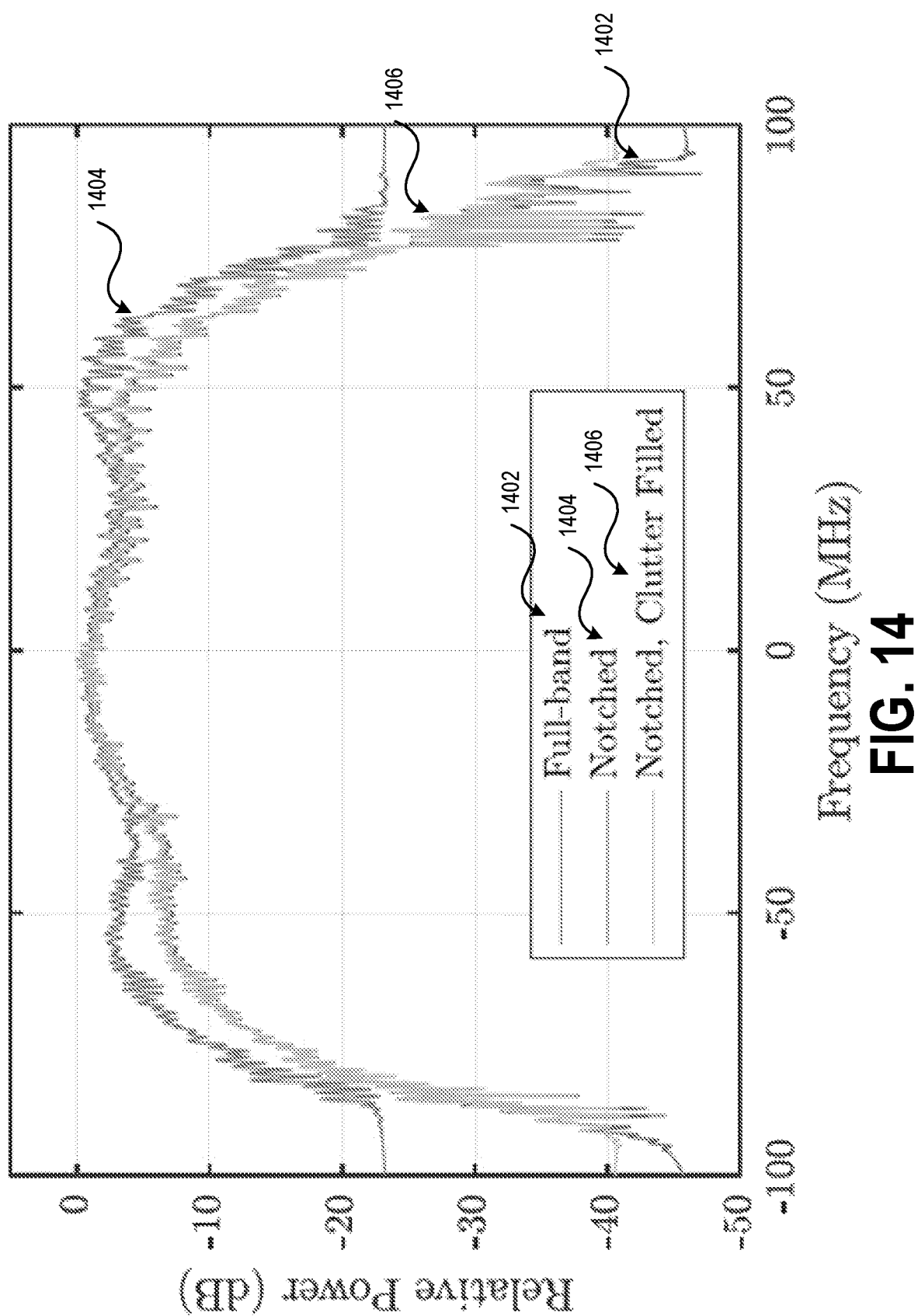
FIG. 14 is an image illustrating an RMS average of the MMF range estimate power spectral densities over a given CPI for full-band, notched without clutter filling, and notched clutter filling with other notched responses (from other temporally-nearby waveform returns) use cases in accordance with aspects of the present disclosure.

Finally, to illustrate a different perspective on how the DeCCaF approach of embodiments may be used to compensate for notch-induced clutter modulation that may occur during processing, a root-mean-squared (RMS) average of the MMF range estimate power spectral densities (PSD) across the CPI in slow-time were examined for Case 1 (full-band), Case 2 (notched without clutter filling), and Case 4 (notched, clutter filling from other notched responses). The PSD of each of these cases is shown in FIG. 14, where line 1402 represents Case 1 (full-band), 1404 represents Case 2 (notched without clutter filling), and line 1406 represents case 4 (notched, clutter filling from other notched responses). As can be seen in FIG. 14, the PSD of Case 2 (e.g., line 1404) employing moving notches exhibits a noticeable deviation from the PSD of Case 1 (e.g., line 1402). However, refilling the missing clutter response via DeCCaF, as in Case 4, returns the PSD quite closely to the full-band case (e.g., line 1406).

As shown above, the DeCCaF approaches disclosed herein, where missing clutter associated with notched waveform returns is filled by borrowing portions of the spectrum of other pulses (or waveform returns) within the CPI, may significantly enhance the clutter cancellation capabilities of radar detection systems, such as the radar detection system 100 of FIG. 1. Moreover, different types of clutter filling approaches may be employed depending on the particular waveforms present in the CPI, such as full-band waveforms, temporally near notched waveforms having notches at different locations than the pulse under consideration, or other techniques. Improving the clutter cancellation capabilities may also enhance the radar detection system's ability to perform moving target detection due to the reduced clutter.

It is noted that while the examples described above have demonstrated the improvements that may be realized by the radar detection system 100 of FIG. 1 in accordance with embodiments of the present disclosure, when spectrally notched waveforms are used for radar detection operations, embodiments of the present disclosure are not limited to utilizing the disclosed DeCCaF techniques (with or without matched or mismatched filter processing) with spectrally notched waveforms. For example, the radar detection system 100 may also be configured to use sense-and-avoid techniques to perform radar operations. As briefly described and illustrated above with reference to FIG. 3, the DeCCaF approach of embodiments may also be applied to such sense-and-avoid waveforms to improve radar detection operations. As will become apparent from the description of FIGS. 15-19, applying the disclosed DeCCaF techniques to sense-and-avoid waveforms may provide advantages similar to those realized when spectrally notched waveforms are used.

Figure 15:
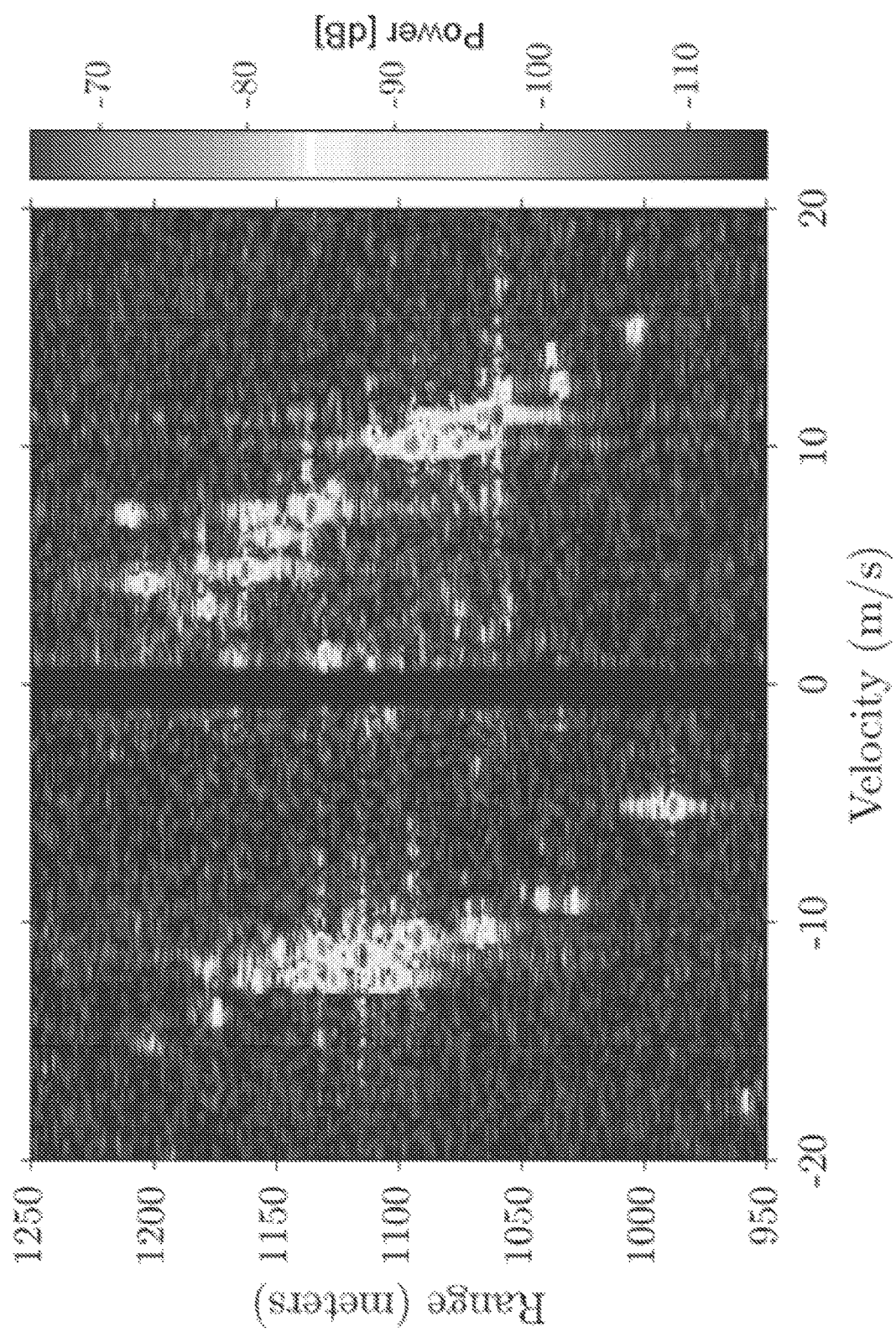
FIG. 15 is an image illustrating a measured range-Doppler response for baseline full band FM chirp waveforms using matched filtering.
Figure 16:
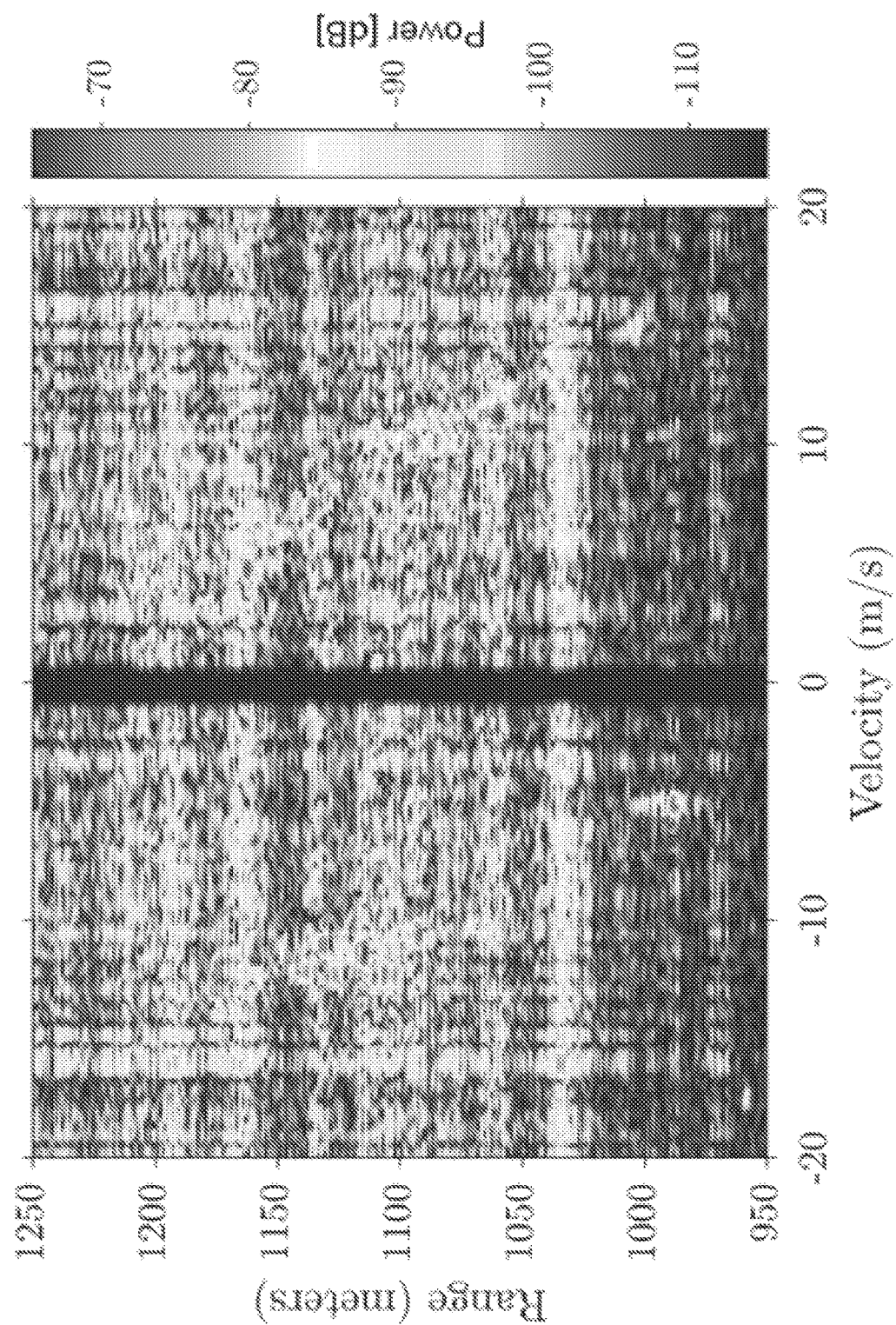
FIG. 16 is an image illustrating a measured range-Doppler response for sense-and-avoid chirp waveforms using matched filtering and no clutter filling.
Figure 17:
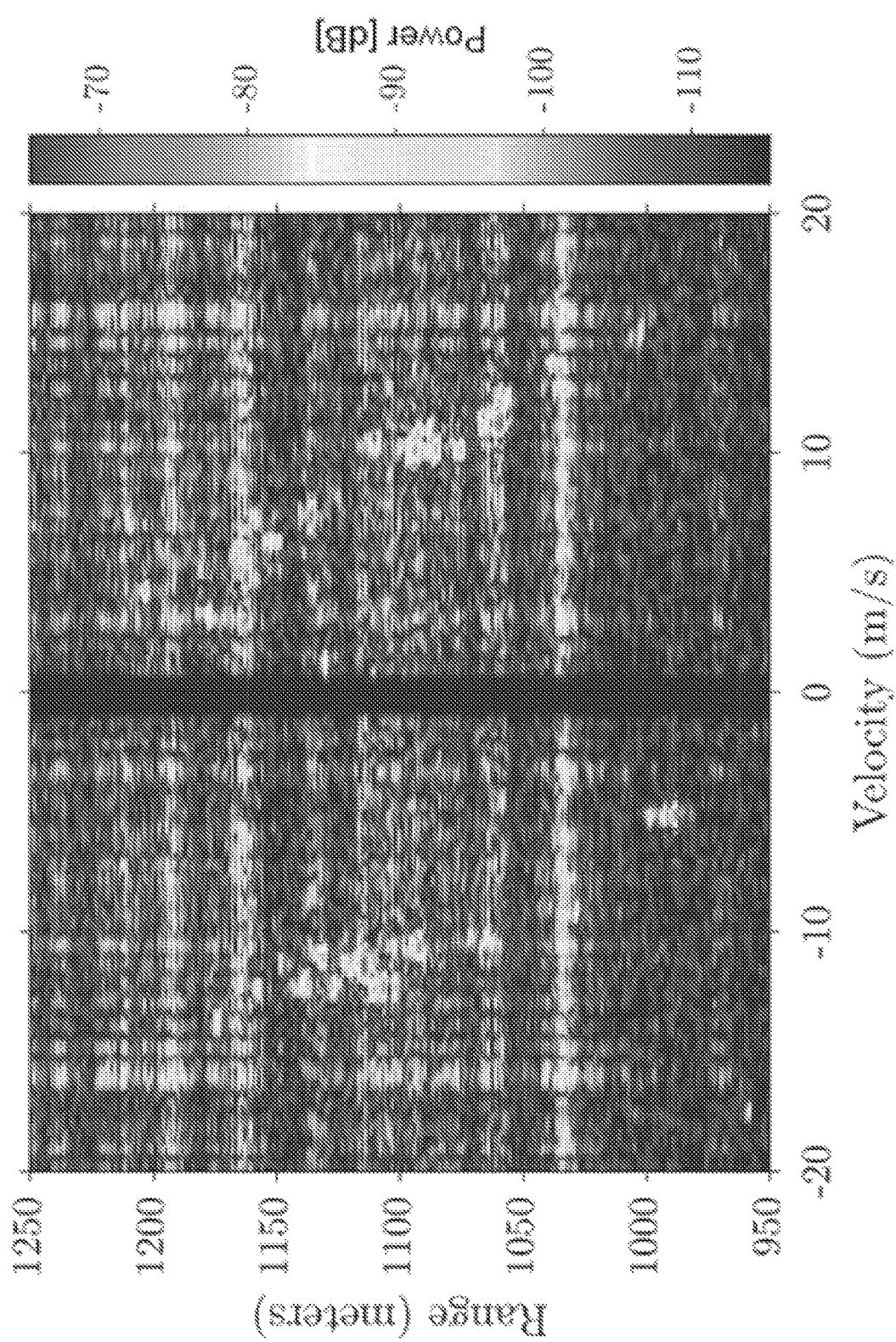
FIG. 17 is an image illustrating a measured range-Doppler response for sense-and-avoid chirp waveforms using mismatched filtering and no clutter filling.
Figure 18:
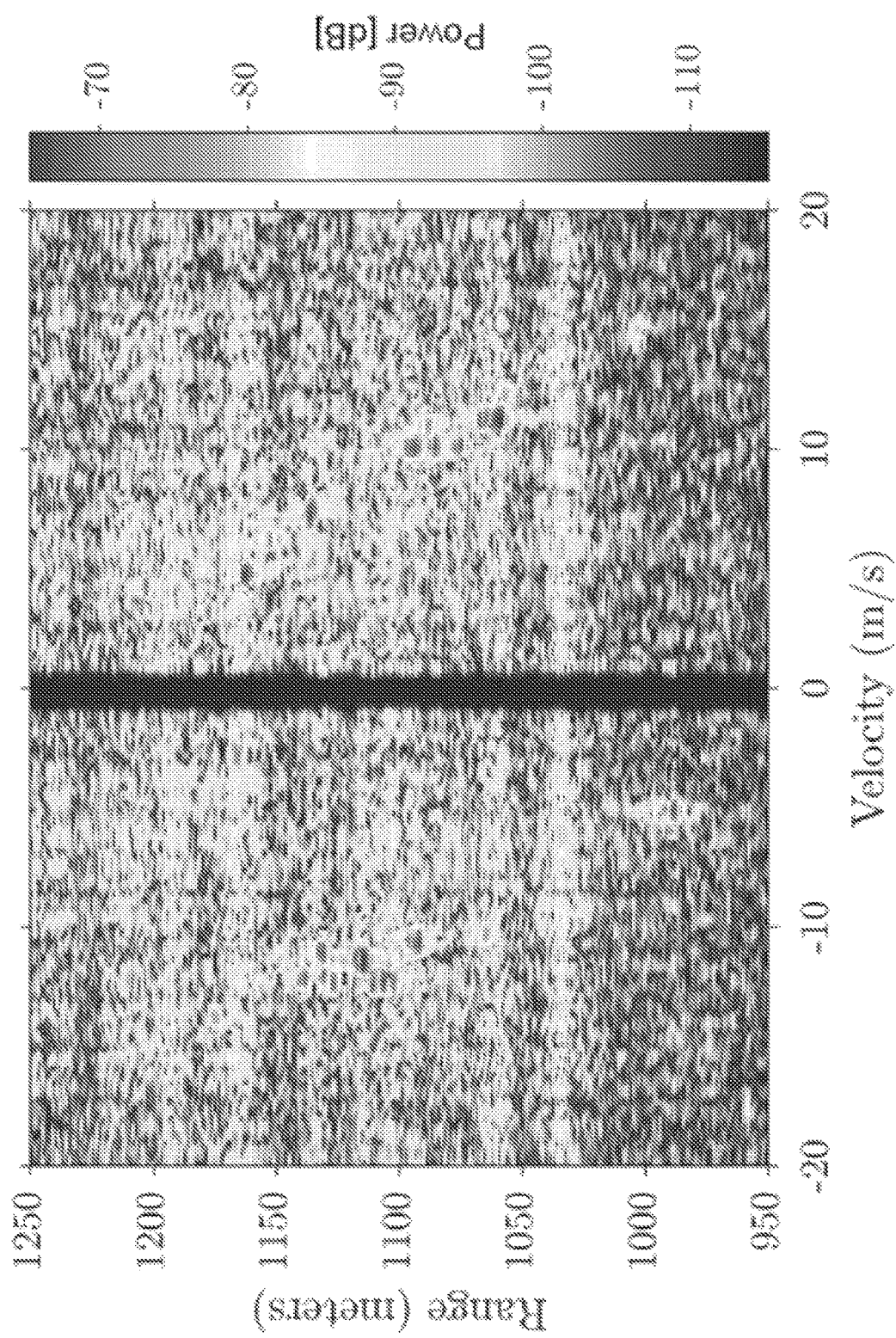
FIG. 18 is an image illustrating a measured range-Doppler response for sense-and-avoid chirp waveforms obtained by applying adjacent spectrally-filtered waveform responses with different spectral occupancy for clutter filling using matched filtering and DeCCaF in accordance with aspects of the present disclosure.
Figure 19:
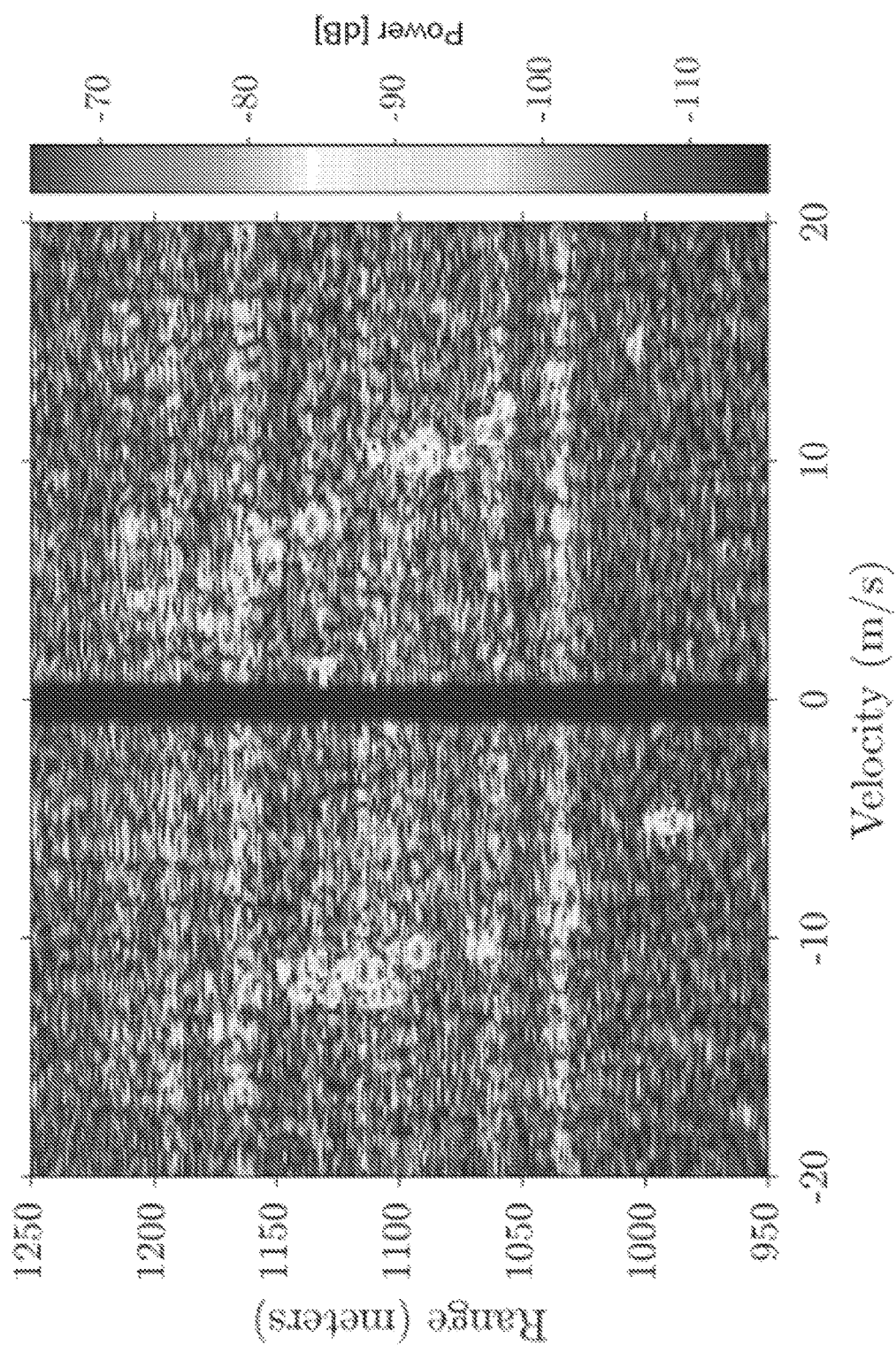
FIG. 19 is an image illustrating a measured range-Doppler response for sense-and-avoid chirp waveforms obtained by applying adjacent spectrally-filtered waveform responses with different spectral occupancy for clutter filling using mismatched filtering and DeCCaF in accordance with aspects of the present disclosure.

FIG. 15 shows the Doppler response of a baseline full-band chirp waveform (e.g., without sense-and-avoid chirp waveforms). Using the Doppler response of FIG. 15 as a baseline, Doppler responses for different cases involving sense-and-avoid waveforms are shown. In particular, FIG. 16 illustrates a Doppler response for sense-and-avoid waveform returns processed with MF and no clutter filling. FIG. 17 illustrates a Doppler response for sense-and-avoid waveform returns processed with MMF and no clutter filling, FIG. 18 illustrates a Doppler response for sense-and-avoid waveform returns processed with MF and DeCCaF clutter filling, and FIG. 19 illustrates a Doppler response for sense-and-avoid waveform returns processed with MMF and DeCCaF clutter filling. The baseline Doppler response of FIG. 15 exhibits only minor clutter modulation. Applying MF to the sense-and-avoid waveform responses (e.g., FIG. 16) yields a Doppler response exhibiting significantly more clutter modulation. Applying MMF to the sense-and-avoid waveform responses (e.g., FIG. 17) reduced the clutter modulation as compared to FIG. 16 but still exhibited significant clutter modulation as compared to the baseline response of FIG. 15. Utilizing MF and DeCCaF (e.g., FIG. 18) resulted in more clutter modulation relative to FIG. 16, where the sense-and-avoid waveforms were processed with MF and no clutter filling. However, combining DeCCaF and MMF techniques, as shown in FIG. 19, resulted in a Doppler response that was improved (e.g., exhibited less clutter modulation) as compared to all other responses except the baseline. The Doppler response shown in FIG. 19 also exhibited less smearing relative to the Doppler response exhibited in the FIG. 16 where sense-and-avoid waveform responses were processed with MMF and no clutter filling.

FIGS. 15-19 demonstrate that the DeCCaF approaches of embodiments may be used to reduce clutter modulation and improve the ability of the radar detection system 100 to perform radar detection operations, such as moving target detection, using sense-and-avoid type pulses. Accordingly, it is to be understood that embodiments of the present disclosure are not limited to DeCCaF approaches for clutter filling with only spectrally notched waveforms. As shown above, the ad hoc approach disclosed herein and referred to as DeCCaF (devoid clutter capture and filling) has been demonstrated on measured data as a means to address the nonstationarity that arises during processing when spectral notches (or other waveforms devoid of clutter information, such as sense-and-avoid waveforms) move during the CPI to combat dynamic RFI. When DeCCaF is combined with appropriately notched MMF techniques the result may be nearly indistinguishable from the case in which no spectral notches are employed at all. Thus, the DeCCaF techniques disclosed herein may enable the radar detection system 100 to achieve improved results despite the presence of a set of pulses that are at least partially devoid of clutter during a CPI.

Figure 20:
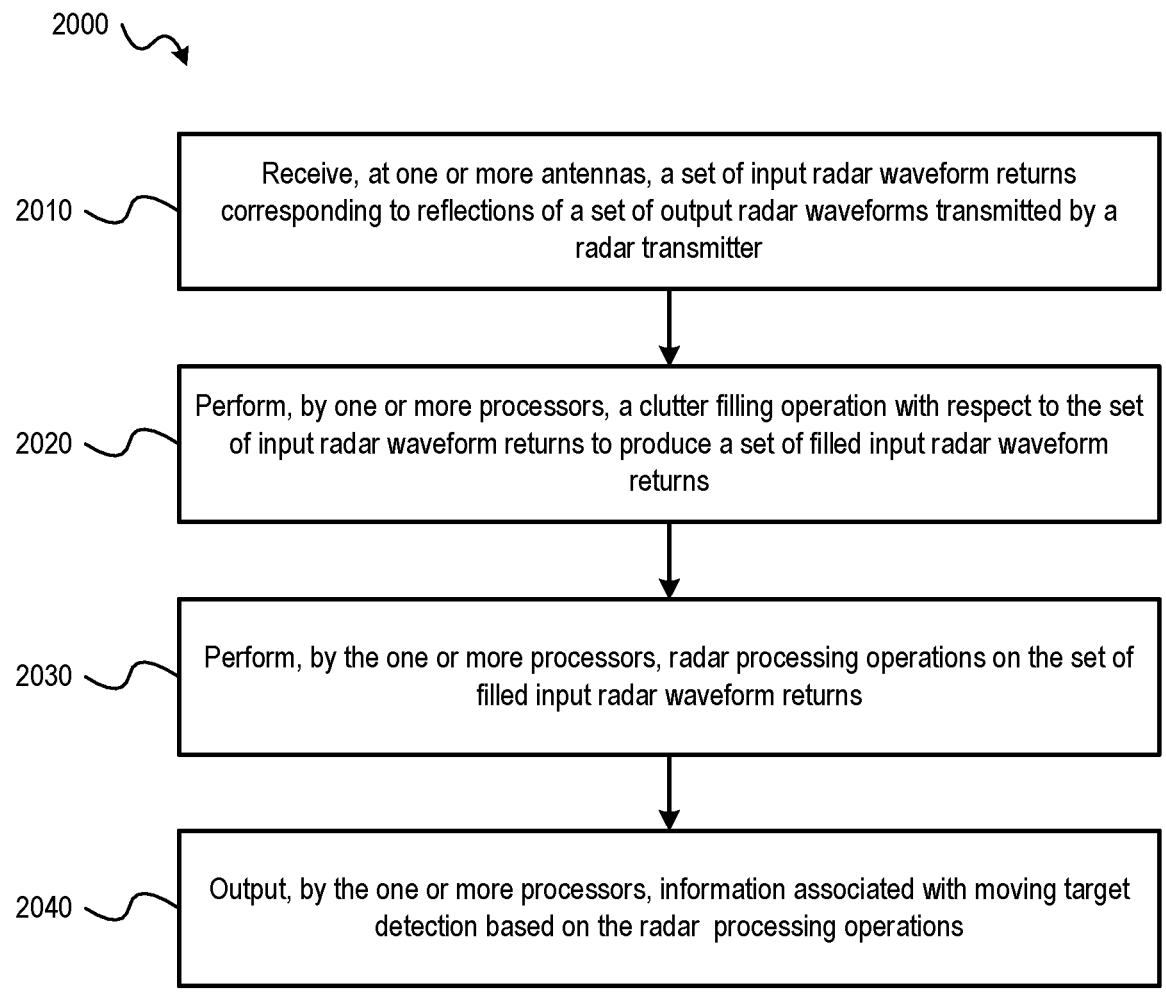
FIG. 20 is a flow diagram of a method for performing radar sensing operations in accordance with aspects of the present disclosure.

Referring to FIG. 20, a flow diagram of an exemplary method for performing moving target detection in accordance with aspects of the present disclosure is shown as a method 2000. In an aspect, the method 2000 may be performed by a radar detection system, such as the radar detection system 100 of FIG. 1. Steps of the method 2000 may be stored as instructions (e.g., the instructions 122 of FIG. 1) that, when executed by one or more processors (e.g., the one or more processors 110 of FIG. 1), cause the one or more processors to perform moving target detection operations in accordance with the DeCCaF techniques described herein.

Referring to FIG. 20, a flow diagram of an exemplary method for performing radar detection operations in accordance with aspects of the present disclosure is shown as a method 2000. In an aspect, the method 2000 may be stored as instructions (e.g., the instructions 122 of FIG. 1) that, when executed by one or more processors (e.g., the one or more processors 110 of FIG. 1), enable a system (e.g., the system 100 of FIG. 1) to perform radar detection operations in accordance with techniques disclosed herein.

At step 2010, the method 2000 includes receiving a set of input radar waveform returns at one or more antennas. The set of input radar waveform returns may correspond to reflections of a set of output radar waveforms transmitted by a radar transmitter. The set of output radar waveforms may exhibit dynamic spectral variation such that spectral power in portions of a given spectral band of each output radar waveform are mitigated. For example, when spectral notches are utilized, the portions of the spectral band of at least some of the input and output radar waveforms may be mitigated at the location of the spectral notch(es). Since the input radar waveform returns are reflections of the output radar waveforms, the set of input radar waveform returns also exhibit the dynamic spectral variation present in the output radar waveforms. As explained above, nonstationarity effects or clutter modulation may be induced by processing the set of input radar waveform returns exhibiting dynamic spectral variation.

At step 2020, the method 2000 includes performing a clutter filling operation with respect to the set of input radar waveform returns to produce a set of clutter filled input radar waveform returns. As explained above, the clutter filling operation may be configured to homogenize the spectrum of each input radar waveform return in the set of input radar waveform returns that exhibits the dynamic spectral variation while being processed during a CPI, which may mitigate the non-stationarity effects that would otherwise be caused by the processing input radar waveform returns exhibiting varying spectral content. As explained above, when the dynamic spectral variation corresponds to spectral notches present in the set of input radar waveform returns, the clutter filling operation may include identifying a first input radar waveform return of the set of input radar waveform returns exhibiting a spectral notch at a first location and identifying a second input radar waveform return of the set of input radar waveform returns that does not have a spectral notch at the first location. Clutter information may be determined from the second input radar waveform return based on a portion of the second input radar waveform return that does not have the spectral notch at the first location. The spectral notch of the first input radar waveform return may then be filled with the clutter information determined based on the second input radar waveform return, as described with reference to waveforms 204 and 206 of FIG. 2. When the dynamic spectral variation is associated with sense-and-avoid waveform returns, the clutter filling operation may include identifying a first input radar waveform return of the set of input radar waveform returns that is devoid of clutter information over a portion of the bandwidth of the first input radar waveform returns and a second input radar waveform return of the set of input radar waveform returns that is not devoid of clutter information (e.g. has spectral content) at the portion of the bandwidth of the first input radar waveform return. Clutter information may be determined based on the second input radar waveform return and used to fill the portion of the bandwidth of the first input radar waveform return, as described above with reference to FIG. 3.

At step 2030, the method 2000 includes performing radar processing operations on the set of filled input radar waveform returns. As illustrated above, borrowing portions of the spectra of different waveform returns and using the borrowed spectra to fill the dynamic spectra variations present in the set of input radar waveform returns may significantly reduce clutter modulation and non-stationary effects upon performing radar processing. The radar processing operations may include Doppler processing, clutter cancellation, other operations, or a combination thereof. Moreover, filtering techniques may also be used, such as mismatched filters to further improve the Doppler responses obtained at step 2030. At step 2040, the method 2000 includes outputting information associated with moving target detection based on the radar processing operations to a display device (e.g., display device 136 of FIG. 1), a database, or some other destination.

As shown above, the DeCCaF approaches of the method 2000, where missing clutter information associated with notched waveform returns is filled by borrowing portions of the spectrum of other pulses (or waveform returns) within the CPI, may significantly enhance the clutter cancellation capabilities of radar detection systems operating in accordance with the method 2000. Moreover, other types of clutter filling approaches may be utilized by radar detection systems operated in accordance with the method 2000 depending on the particular waveforms present in the CPI, such as full-band waveforms, temporally near notched waveforms having notches at different locations than the pulse under consideration, sense-and-avoid waveforms, amplitude modulated (AM) waveforms, chirp waveforms, FM waveforms, or other techniques. Improving the clutter cancellation capabilities may also enhance the radar detection system's ability to perform moving target detection due to the reduced clutter.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
receiving, at one or more antennas, a set of input radar waveform returns corresponding to reflections of a set of output radar waveforms transmitted by a radar transmitter, wherein the set of output radar waveforms exhibits dynamic spectral variation such that spectral power in portions of a given spectral band of each output radar waveform is mitigated, wherein the set of input radar waveform returns exhibit the dynamic spectral variation;
performing, by one or more processors, a clutter filling operation with respect to the set of input radar waveform returns to produce a set of filled input radar waveform returns, wherein the clutter filling operation is configured to homogenize a spectrum of each input radar waveform return in the set of input radar waveform returns exhibiting the dynamic spectral variation so as to mitigate non-stationarity effects caused by processing radar waveform returns exhibiting dynamic spectral variation;
performing, by the one or more processors, radar processing operations on the set of filled input radar waveform returns; and
outputting, by the one or more processors, information associated with moving target detection based on the radar processing operations.

2. The method of claim 1, wherein the dynamic spectral variation corresponds to spectral notches present in the set of input radar waveform returns, and wherein the clutter filling operation comprises:
identifying a first input radar waveform return of the set of input radar waveform returns exhibiting a spectral notch at a first location;
identifying a second input radar waveform return of the set of input radar waveform returns that does not have the spectral notch at the first location;
determining clutter information based on the second input radar waveform return that does not have the spectral notch at the first location; and
filling the spectral notch of the first input radar waveform return with the clutter information determined based on the second input radar waveform return.

3. The method of claim 2, wherein the clutter information is obtained from a portion of a spectrum of the second input radar waveform return corresponding to the first location of the spectral notch of the input radar waveform return.

4. The method of claim 1, wherein the dynamic spectral variation is associated with sense-and-avoid waveforms, and wherein the clutter filling operation comprises:
  identifying a first input radar waveform return of the set of input radar waveform returns that is devoid of clutter information over a portion of bandwidth of the first input radar waveform return;
  identifying a second input radar waveform return of the set of input radar waveform returns that is not devoid of clutter information of the portion of the bandwidth of the first input radar waveform return;
  determining clutter information based on the second input radar waveform return; and
  filling the portion of the bandwidth of the first input radar waveform return with the clutter information determined based on the second input radar waveform return.

5. The method of claim 1, further comprising filtering the set of filled input radar waveform returns prior to performing the radar processing operations, wherein the radar processing operations comprise Doppler processing, clutter cancellation, or both.

6. The method of claim 5, wherein the filtering is performed using a matched filter.

7. The method of claim 5, wherein the filtering is performed using a mismatched filter.

8. The method of claim 1, further comprising transmitting, by the radar transmitter, the set of output radar waveforms.

9. The method of claim 1, wherein the information associated with moving target detection is output to a display device.

10. A non-transitory computer-readable storage medium storing instructions that, when executed by one or more processors, cause the one or more processors to perform operations for radar detection of moving targets, the operations comprising:
  receiving a set of input radar waveform returns at one or more antennas, the set of input radar waveform returns corresponding to reflections of a set of output radar waveforms transmitted by a radar transmitter, wherein the set of output radar waveforms exhibits dynamic spectral variation such that spectral power in portions of a given spectral band of each output radar waveform are mitigated, and wherein the set of input radar waveform returns exhibits the dynamic spectral variation;
  performing a clutter filling operation with respect to the set of input radar waveform returns to produce a set of filled input radar waveform returns, wherein the clutter filling operation is configured to homogenize a spectrum of each input radar waveform return in the set of input radar waveform returns exhibiting the dynamic spectral variation so as to mitigate non-stationarity effects caused by processing radar waveform returns exhibiting dynamic spectral variation;
  performing radar processing operations on the set of filled input radar waveform returns; and
  outputting information associated with moving target detection based on the processing operations to a display device.

11. The non-transitory computer-readable storage medium of claim 10, wherein the dynamic spectral variation corresponds to spectral notches present in the set of input radar waveform returns, and wherein the clutter filling operation comprises:
  identifying a first input radar waveform return of the set of input radar waveform returns exhibiting a spectral notch at a first location;
  identifying a second input radar waveform return of the set of input radar waveform returns that does not have the spectral notch at the first location;
  determining clutter information based on the second input radar waveform return that does not have the spectral notch at the first location; and
  filling the spectral notch of the first input radar waveform return with the clutter information determined based on the second input radar waveform return.

12. The non-transitory computer-readable storage medium of claim 11, wherein the clutter information is obtained from a portion of a spectrum of the second input radar waveform return corresponding to the first location of the spectral notch of the input radar waveform return.

13. The non-transitory computer-readable storage medium of claim 10, wherein the dynamic spectral variation is associated with sense-and-avoid waveforms, and wherein the clutter filling operation comprises:
  identifying a first input radar waveform return of the set of input radar waveform returns that is devoid of clutter information over a portion of bandwidth of the first input radar waveform return;
  identifying a second input radar waveform return of the set of input radar waveform returns that is not devoid of clutter information of the portion of the bandwidth of the first input radar waveform return;
  determining clutter information based on the second input radar waveform return; and
  filling the portion of the bandwidth of the first input radar waveform return with the clutter information determined based on the second input radar waveform return.

14. The non-transitory computer-readable storage medium of claim 10, the operations further comprising filtering the set of filled input radar waveform returns prior to performing the radar processing operations, wherein the filtering is performed using a matched filter or a mismatched filter, and wherein the radar processing operations comprise Doppler processing, clutter cancellation, or both.

15. The non-transitory computer-readable storage medium of claim 10, the operations further comprising transmitting, by the radar transmitter, the set of output radar waveforms.

16. A system comprising:
  a display device,
  a radar transmitter configured to transmit a set of output radar waveforms, wherein the set of output radar waveforms exhibits dynamic spectral variation such that spectral power in portions of a given spectral band of each output radar waveform are mitigated;
  one or more antennas configured to receive a set of input radar waveform returns corresponding to reflections of the set of output radar waveforms transmitted by the radar transmitter, wherein the set of input radar waveform returns exhibits the dynamic spectral variation; and
  one or more processors communicatively coupled to the display device, the radar transmitter, and the one or more antennas, the one or more processors configured to:
    perform a clutter filling operation with respect to the set of input radar waveform returns to produce a set of filled input radar waveform returns, wherein the clutter filling operation is configured to homogenize a spectrum of each input radar waveform return in the set of input radar waveform returns exhibiting the dynamic spectral variation so as to mitigate non-stationarity effects caused by processing radar waveform returns exhibiting dynamic spectral variation;

perform radar processing operations on the set of filled input radar waveform returns; and output information associated with moving target detection based on the radar processing operations to the display devices.

17. The system of claim 16, wherein the dynamic spectral variation corresponds to spectral notches present in the set of input radar waveform returns, and wherein the clutter filling operation comprises:

identifying a first input radar waveform return of the set of input radar waveform returns exhibiting a spectral notch at a first location;

identifying a second input radar waveform return of the set of input radar waveform returns that does not have the spectral notch at the first location;

determining clutter information based on the second input radar waveform return that does not have the spectral notch at the first location; and filling the spectral notch of the first input radar waveform return with the clutter information determined based on the second input radar waveform return.

18. The system of claim 17, wherein the clutter information is obtained from a portion of a spectrum of the second input radar waveform return corresponding to the first location of the spectral notch of the input radar waveform return.

19. The system of claim 16, wherein the dynamic spectral variation is associated with sense-and-avoid waveforms, and wherein the clutter filling operation comprises:

identifying a first input radar waveform return of the set of input radar waveform returns that is devoid of clutter information over a portion of bandwidth of the first input radar waveform return;

identifying a second input radar waveform return of the set of input radar waveform returns that is not devoid of clutter information of the portion of the bandwidth of the first input radar waveform return;

determining clutter information based on the second input radar waveform return; and filling the portion of the bandwidth of the first input radar waveform return with the clutter information determined based on the second input radar waveform return.

20. The system of claim 16, further comprising filtering the set of filled input radar waveform returns prior to performing the radar processing operations, wherein the filtering is performed using a matched filter or a mismatched filter, and wherein the radar processing operations comprise Doppler processing, clutter cancellation, or both.

* * * * *

UNITED STATES PATENT AND TRADEMARK OFFICE
CERTIFICATE OF CORRECTION

| | |
|---|---|
| PATENT NO. | : 11,644,531 B2 |
| APPLICATION NO. | : 17/761391 |
| DATED | : May 9, 2023 |
| INVENTOR(S) | : Jonathan William Owen et al. |

It is certified that error appears in the above-identified patent and that said Letters Patent is hereby corrected as shown below:

In the Specification

At Column 6, Line number 5, delete "(RANI)" and replace with --(RAM)--.
At Column 8, Line number 59, delete "the value of a may be set" and replace with --the value of $\sigma$ may be set--.

Signed and Sealed this
Thirteenth Day of June, 2023

Katherine Kelly Vidal
*Director of the United States Patent and Trademark Office*